United States Patent
Vaish et al.

(10) Patent No.: US 10,735,552 B2
(45) Date of Patent: Aug. 4, 2020

(54) SECONDARY TRANSMISSIONS OF PACKETIZED DATA

(71) Applicant: Google Inc., Mountain View, CA (US)

(72) Inventors: Vaibhav Vaish, Mountain View, CA (US); Venky Ramachandran, Cupertino, CA (US); David Philip Sisson, Fremont, CA (US); Ramakrishnan Kandhan, Mountain View, CA (US); Pramod Adiddam, Santa Clara, CA (US); Vinod Marur, Palo Alto, CA (US); Gaurav Garg, San Francisco, CA (US); Gaurav Bhaya, Sunnyvale, CA (US); Robert Stets, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/603,701

(22) Filed: May 24, 2017

(65) Prior Publication Data

US 2017/0257456 A1    Sep. 7, 2017

Related U.S. Application Data

(63) Continuation-in-part of application No. 15/395,703, filed on Dec. 30, 2016, now Pat. No. 10,032,452, and
(Continued)

(51) Int. Cl.
*H04L 29/08* (2006.01)
*H04L 12/26* (2006.01)
(Continued)

(52) U.S. Cl.
CPC .......... *H04L 67/32* (2013.01); *G06F 16/9535* (2019.01); *G10L 15/22* (2013.01);
(Continued)

(58) Field of Classification Search
CPC ......... H04L 67/32; H04L 67/42; H04L 43/08; G06F 17/30867; G10L 15/22; G10L 2015/223
See application file for complete search history.

(56) References Cited

U.S. PATENT DOCUMENTS

| 5,675,788 A | 10/1997 | Husick et al. |
| 5,724,521 A | 3/1998 | Dedrick |

(Continued)

FOREIGN PATENT DOCUMENTS

| EP | 1 271 458 | 1/2003 |
| EP | 1 286 288 | 2/2003 |

(Continued)

OTHER PUBLICATIONS

"Walmart and Google to offer voice-enabled shopping", BBC News, Aug. 23, 2017.
(Continued)

*Primary Examiner* — Jeffrey M Rutkowski
*Assistant Examiner* — Chae S Lee
(74) *Attorney, Agent, or Firm* — Foley & Lardner LLP; James De Vellis

(57) ABSTRACT

A system for transmission of packetized data in a voice activated computer network environment. The system can identify candidate canonicalized digital components that relate to secondary search locations. For each of the candidate canonicalized digital components the system can calculate transmissions scores that are used to select one of the candidate canonicalized digital components for transmission.

20 Claims, 11 Drawing Sheets

Related U.S. Application Data a continuation-in-part of application No. 13/840,380, filed on Mar. 15, 2013.

(60) Provisional application No. 61/758,979, filed on Jan. 31, 2013.

(51) Int. Cl.

| | | |
|---|---|---|
| *H04L 29/06* | (2006.01) | |
| *G10L 15/22* | (2006.01) | |
| *G06F 16/9535* | (2019.01) | |

(52) U.S. Cl.
CPC .............. *H04L 43/08* (2013.01); *H04L 67/42* (2013.01); *G10L 2015/223* (2013.01)

(56) References Cited

U.S. PATENT DOCUMENTS

| | | | |
|---|---|---|---|
| 5,740,549 | A | 4/1998 | Reilly et al. |
| 5,749,069 | A | 5/1998 | Komori et al. |
| 5,848,397 | A | 12/1998 | Marsh et al. |
| 5,850,433 | A | 12/1998 | Rondeau |
| 5,930,773 | A | 7/1999 | Crooks et al. |
| 5,948,061 | A | 9/1999 | Merriman et al. |
| 6,026,368 | A | 2/2000 | Brown et al. |
| 6,044,376 | A | 3/2000 | Kurtzman, II |
| 6,078,914 | A | 6/2000 | Redfern |
| 6,088,688 | A | 7/2000 | Crooks et al. |
| 6,125,284 | A | 9/2000 | Moore et al. |
| 6,144,944 | A | 11/2000 | Kurtzman et al. |
| 6,167,382 | A | 12/2000 | Sparks et al. |
| 6,189,003 | B1 | 2/2001 | Leal |
| 6,259,127 | B1 | 7/2001 | Pan |
| 6,259,405 | B1 | 7/2001 | Stewart et al. |
| 6,269,361 | B1 | 7/2001 | Davis et al. |
| 6,275,806 | B1 | 8/2001 | Pertrushin |
| 6,332,127 | B1 | 12/2001 | Bandera et al. |
| 6,401,075 | B1 | 6/2002 | Mason et al. |
| 6,446,045 | B1 | 9/2002 | Stone et al. |
| 6,600,930 | B1 | 7/2003 | Sakurai et al. |
| 6,647,257 | B2 | 11/2003 | Owensby |
| 6,665,293 | B2 | 12/2003 | Thornton et al. |
| 6,677,894 | B2 | 1/2004 | Sheynblat et al. |
| 6,684,249 | B1 | 1/2004 | Frerichs et al. |
| 6,731,612 | B1 | 5/2004 | Koss |
| 6,857,007 | B1 | 2/2005 | Bloomfield |
| 6,956,816 | B1 | 10/2005 | Alexander et al. |
| 6,983,331 | B1 | 1/2006 | Mitchell et al. |
| 6,985,882 | B1 | 1/2006 | Del Sesto |
| 7,016,343 | B1 | 3/2006 | Mermel et al. |
| 7,039,599 | B2 | 5/2006 | Merriman et al. |
| 7,120,235 | B2 | 10/2006 | Altberg et al. |
| 7,136,875 | B2 | 11/2006 | Anderson et al. |
| 7,240,025 | B2 | 7/2007 | Stone et al. |
| 7,376,640 | B1 | 5/2008 | Anderson et al. |
| 7,406,434 | B1 | 7/2008 | Chang et al. |
| 7,613,637 | B2 | 11/2009 | Chan et al. |
| 7,668,950 | B2 | 2/2010 | Horowitz et al. |
| 7,853,255 | B2 | 12/2010 | Karaoguz et al. |
| 7,881,936 | B2 | 2/2011 | Longe et al. |
| 7,904,460 | B2 | 3/2011 | Armour et al. |
| 7,920,682 | B2 | 4/2011 | Byrne et al. |
| 8,041,709 | B2 | 10/2011 | Permandla et al. |
| 8,068,604 | B2 | 11/2011 | Leeds et al. |
| 8,108,383 | B2 | 1/2012 | Lin et al. |
| 8,175,914 | B1 | 5/2012 | Benson et al. |
| 8,195,133 | B2 | 6/2012 | Ramer et al. |
| 8,204,881 | B2 | 6/2012 | Holt et al. |
| 8,214,342 | B2 | 7/2012 | Meiresonne |
| 8,234,275 | B2 | 7/2012 | Grant et al. |
| 8,312,014 | B2 | 11/2012 | Lu et al. |
| 8,326,637 | B2 | 12/2012 | Baldwin et al. |
| 8,386,386 | B1 | 2/2013 | Zhu |
| 8,453,058 | B1 | 5/2013 | Coccaro et al. |
| 8,612,226 | B1 | 12/2013 | Epstein et al. |
| 8,762,156 | B2 | 6/2014 | Chen |
| 8,903,716 | B2 | 12/2014 | Chen et al. |
| 9,275,637 | B1 | 3/2016 | Salvador et al. |
| 9,318,107 | B1 | 4/2016 | Sharifi |
| 9,424,841 | B2 | 8/2016 | Foerster et al. |
| 9,431,006 | B2 | 8/2016 | Bellegarda |
| 9,542,941 | B1 | 1/2017 | Weksler et al. |
| 9,653,075 | B1 | 5/2017 | Chen et al. |
| 10,032,452 | B1 | 7/2018 | Bhaya et al. |
| 10,165,091 | B1 | 12/2018 | Bittfield et al. |
| 10,193,465 | B2 | 1/2019 | Dai et al. |
| 10,535,348 | B2 | 1/2020 | Bhaya et al. |
| 2001/0020236 | A1 | 9/2001 | Cannon |
| 2001/0025275 | A1 | 9/2001 | Tanaka et al. |
| 2002/0029226 | A1 | 3/2002 | Li et al. |
| 2002/0042829 | A1 | 4/2002 | Mizuhara et al. |
| 2002/0077130 | A1 | 6/2002 | Owensby |
| 2002/0082938 | A1 | 6/2002 | Borger et al. |
| 2002/0091571 | A1 | 7/2002 | Thomas et al. |
| 2002/0128908 | A1 | 9/2002 | Levin et al. |
| 2002/0161646 | A1 | 10/2002 | Gailey et al. |
| 2002/0164977 | A1 | 11/2002 | Link, II et al. |
| 2002/0188680 | A1 | 12/2002 | McCormack et al. |
| 2003/0008661 | A1 | 1/2003 | Joyce et al. |
| 2003/0018479 | A1 | 1/2003 | Oh et al. |
| 2003/0028529 | A1 | 2/2003 | Cheung et al. |
| 2003/0032406 | A1 | 2/2003 | Minear et al. |
| 2003/0032409 | A1 | 2/2003 | Hutcheson et al. |
| 2003/0033079 | A1 | 2/2003 | Endicott |
| 2003/0033292 | A1 | 2/2003 | Meisel et al. |
| 2003/0046161 | A1 | 3/2003 | Kamangar et al. |
| 2003/0061211 | A1 | 3/2003 | Shultz et al. |
| 2003/0105677 | A1 | 6/2003 | Skinner |
| 2003/0125977 | A1 | 7/2003 | Morioka et al. |
| 2003/0154072 | A1 | 8/2003 | Young et al. |
| 2003/0220835 | A1 | 11/2003 | Barnes, Jr. |
| 2004/0023666 | A1 | 2/2004 | Moon et al. |
| 2004/0030556 | A1 | 2/2004 | Bennett |
| 2004/0043770 | A1 | 3/2004 | Amit et al. |
| 2004/0044565 | A1 | 3/2004 | Kumar et al. |
| 2004/0044571 | A1 | 3/2004 | Bronnimann et al. |
| 2004/0059712 | A1 | 3/2004 | Dean et al. |
| 2004/0076279 | A1 | 4/2004 | Taschereau |
| 2004/0083133 | A1 | 4/2004 | Nicholas et al. |
| 2004/0085894 | A1 | 5/2004 | Wang et al. |
| 2004/0120323 | A1 | 6/2004 | Viikari et al. |
| 2004/0172389 | A1 | 9/2004 | Galai et al. |
| 2004/0220778 | A1 | 11/2004 | Imai et al. |
| 2005/0027659 | A1 | 2/2005 | Kumar et al. |
| 2005/0065999 | A1 | 3/2005 | Acharya et al. |
| 2005/0074102 | A1 | 4/2005 | Altberg et al. |
| 2005/0076017 | A1 | 4/2005 | Rein et al. |
| 2005/0086104 | A1 | 4/2005 | McFadden |
| 2005/0097204 | A1 | 5/2005 | Horowitz et al. |
| 2005/0137939 | A1 | 6/2005 | Calabria et al. |
| 2005/0144065 | A1 | 6/2005 | Calabria et al. |
| 2005/0144069 | A1 | 6/2005 | Wiseman et al. |
| 2005/0187823 | A1 | 8/2005 | Howes |
| 2005/0225810 | A1 | 10/2005 | Sun |
| 2005/0234879 | A1 | 10/2005 | Zeng et al. |
| 2006/0004627 | A1 | 1/2006 | Baluja |
| 2006/0149624 | A1 | 7/2006 | Baluja et al. |
| 2006/0195819 | A1 | 8/2006 | Chory et al. |
| 2006/0247913 | A1 | 11/2006 | Huerta et al. |
| 2006/0274869 | A1 | 12/2006 | Morse |
| 2006/0287919 | A1 | 12/2006 | Rubens et al. |
| 2007/0005570 | A1 | 1/2007 | Hurst-Hiller et al. |
| 2007/0088609 | A1 | 4/2007 | Reller et al. |
| 2007/0097975 | A1 | 5/2007 | Rakers et al. |
| 2007/0100822 | A1* | 5/2007 | Freeman ........... G06F 16/90335 |
| 2007/0127688 | A1 | 6/2007 | Doulton |
| 2007/0282612 | A1 | 12/2007 | Kaneko et al. |
| 2007/0294229 | A1 | 12/2007 | Au |
| 2008/0021604 | A1 | 1/2008 | Bouvier et al. |
| 2008/0049696 | A1 | 2/2008 | Stewart |
| 2008/0052219 | A1 | 2/2008 | Sandholm et al. |
| 2008/0071536 | A1 | 3/2008 | Nagashima |
| 2008/0103781 | A1 | 5/2008 | Wasson et al. |
| 2008/0227484 | A1 | 9/2008 | Auvray et al. |

(56) References Cited

U.S. PATENT DOCUMENTS

| | | |
|---|---|---|
| 2008/0228494 A1* | 9/2008 | Cross ................ G06F 17/30899 704/275 |
| 2008/0243785 A1* | 10/2008 | Stading ............ G06F 17/30867 |
| 2008/0249855 A1 | 10/2008 | Collins et al. |
| 2008/0270223 A1 | 10/2008 | Collins et al. |
| 2008/0270224 A1 | 10/2008 | Portman et al. |
| 2008/0294609 A1 | 11/2008 | Liu et al. |
| 2008/0305778 A1 | 12/2008 | Aaltonen et al. |
| 2009/0210491 A1 | 8/2009 | Thakkar et al. |
| 2009/0228281 A1 | 9/2009 | Singleton et al. |
| 2009/0240670 A1 | 9/2009 | Tiyyagura et al. |
| 2010/0198772 A1 | 8/2010 | Silverman et al. |
| 2010/0306229 A1 | 12/2010 | Timm et al. |
| 2011/0010240 A1 | 1/2011 | Veach |
| 2011/0014925 A1 | 1/2011 | Antic et al. |
| 2011/0022460 A1 | 1/2011 | Bhatia et al. |
| 2011/0087660 A1 | 4/2011 | Yu et al. |
| 2011/0141925 A1 | 6/2011 | Velenko et al. |
| 2011/0202494 A1 | 8/2011 | Shin et al. |
| 2011/0264644 A1 | 10/2011 | Grant et al. |
| 2011/0295682 A1 | 12/2011 | Liu |
| 2011/0295990 A1 | 12/2011 | St. Jean et al. |
| 2011/0307436 A1 | 12/2011 | Cai et al. |
| 2011/0320114 A1 | 12/2011 | Buxton et al. |
| 2012/0016897 A1* | 1/2012 | Tulumbas ......... G06F 17/30887 707/759 |
| 2012/0030015 A1 | 2/2012 | Brunsman et al. |
| 2012/0036226 A1 | 2/2012 | Chor |
| 2012/0101776 A1 | 4/2012 | Brower et al. |
| 2012/0102020 A1 | 4/2012 | Pearson |
| 2012/0102087 A1 | 4/2012 | Chor |
| 2012/0138671 A1 | 6/2012 | Gaede et al. |
| 2012/0155838 A1 | 6/2012 | Gerhards et al. |
| 2012/0158954 A1 | 6/2012 | Heffernan et al. |
| 2012/0166277 A1 | 6/2012 | Gnanamani et al. |
| 2012/0221724 A1 | 8/2012 | Chor |
| 2012/0265528 A1 | 10/2012 | Gruber et al. |
| 2012/0297174 A1 | 11/2012 | Frank et al. |
| 2013/0013749 A1 | 1/2013 | Kane et al. |
| 2013/0073400 A1 | 3/2013 | Heath |
| 2013/0117022 A1 | 5/2013 | Chen et al. |
| 2013/0124606 A1 | 5/2013 | Carpenter et al. |
| 2013/0144720 A1 | 6/2013 | Hari et al. |
| 2013/0185074 A1 | 7/2013 | Gruber et al. |
| 2013/0191226 A1 | 7/2013 | Smallwood et al. |
| 2013/0275164 A1* | 10/2013 | Gruber .................... G10L 17/22 705/5 |
| 2013/0304758 A1 | 11/2013 | Gruber et al. |
| 2013/0325449 A1 | 12/2013 | Levien et al. |
| 2013/0339030 A1 | 12/2013 | Ehsani et al. |
| 2014/0074895 A1 | 3/2014 | Ingerman et al. |
| 2014/0095583 A1 | 4/2014 | Houle |
| 2014/0115635 A1* | 4/2014 | Mashimo ........... H04N 21/4668 725/53 |
| 2014/0229184 A1 | 8/2014 | Shires |
| 2014/0337028 A1 | 11/2014 | Wang et al. |
| 2014/0350938 A1 | 11/2014 | Schroeter |
| 2015/0081288 A1 | 3/2015 | Kim |
| 2015/0106085 A1 | 4/2015 | Lindahl |
| 2015/0221305 A1 | 8/2015 | Sharifi |
| 2016/0105718 A1 | 4/2016 | Xu et al. |
| 2016/0180846 A1 | 6/2016 | Lee |
| 2016/0217790 A1 | 7/2016 | Sharifi |
| 2016/0223640 A1 | 8/2016 | Vilermo et al. |
| 2016/0246929 A1 | 8/2016 | Zenati et al. |
| 2016/0259497 A1* | 9/2016 | Foss ....................... G06F 3/0482 |
| 2017/0069317 A1 | 3/2017 | Kwon |
| 2017/0092278 A1 | 3/2017 | Evermann et al. |
| 2017/0110130 A1 | 4/2017 | Sharifi et al. |
| 2017/0110144 A1 | 4/2017 | Sharifi et al. |
| 2017/0132019 A1 | 5/2017 | Karashchuk et al. |
| 2017/0147585 A1 | 5/2017 | Kleindienst et al. |
| 2017/0289596 A1 | 10/2017 | Krasadakis et al. |
| 2017/0358301 A1 | 12/2017 | Raitio et al. |
| 2017/0358302 A1* | 12/2017 | Orr .................... G06F 17/30026 |
| 2018/0322536 A1 | 11/2018 | Zhang et al. |

FOREIGN PATENT DOCUMENTS

| | | |
|---|---|---|
| GB | 2 305 747 | 4/1997 |
| JP | 11-065950 | 9/1999 |
| JP | 11-265347 | 9/1999 |
| JP | 2001-236410 | 8/2001 |
| JP | 2001-282982 | 10/2001 |
| JP | 2001-297256 | 10/2001 |
| JP | 2001-312646 | 11/2001 |
| JP | 2001-312649 | 11/2001 |
| JP | 2002-007253 | 1/2002 |
| JP | 2002-016970 | 1/2002 |
| JP | 2002-073666 | 3/2002 |
| JP | 2002-099822 | 4/2002 |
| JP | 2002-132827 | 5/2002 |
| JP | 2002-140359 | 5/2002 |
| JP | 2002-169744 | 6/2002 |
| JP | 2002-170027 | 6/2002 |
| JP | 2002-245048 | 8/2002 |
| JP | 2002-288541 A | 10/2002 |
| JP | 2003-016348 | 1/2003 |
| JP | 2003-122781 | 4/2003 |
| JP | 2003-223591 | 8/2003 |
| JP | 2003-263584 | 9/2003 |
| JP | 2003-337893 | 11/2003 |
| JP | 2004-032037 | 1/2004 |
| JP | 2006-236324 A | 9/2006 |
| JP | 2011-192102 | 3/2010 |
| JP | 2013-540306 A | 10/2013 |
| JP | 2015-001815 A | 1/2015 |
| JP | 2016-111406 A | 6/2016 |
| KR | 2000-0054165 A | 9/2000 |
| KR | 200054165 | 9/2000 |
| KR | 2002-69767 | 9/2002 |
| KR | 2003-39736 | 5/2003 |
| KR | 2010-0126796 A | 12/2010 |
| KR | 2015-0097816 A | 8/2015 |
| WO | WO-97/21183 A | 6/1997 |
| WO | WO-00/42544 | 7/2000 |
| WO | WO-01/59546 A2 | 8/2001 |
| WO | WO-01/93138 | 12/2001 |
| WO | WO-2012/094329 | 7/2012 |
| WO | WO-2014/004489 A1 | 1/2014 |
| WO | WO-2015/133022 A1 | 9/2015 |

OTHER PUBLICATIONS

Crist, Ry, "Logitech Harmony's Alexa Skill just got a whole lot better", cnet, Jul. 13, 2017 (2 pages).
Gibbs, Samuel, "Your Facebook Messenger app is about to be filled with ads", The Guardian, Jul. 12, 2017 (3 pages).
Hardwick, Tim, "Facebook Smart Speaker Coming Next Year With 15-inch Touch Panel", MacRumors, Jul. 25, 2017 (5 pages).
International Search Report on International Application No. PCT/US2005/023023, dated Oct. 23, 2006, 2 pages.
Kelion, Leo, "Amazon's race to make Alexa smarter", BBC News, Jul. 28, 2017 (8 pages).
U.S. Office Action on U.S. Appl. No. 14/172,353 dated Aug. 10, 2017, 15 pages.
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Barr, "AWS DeepLens—Get Hands-On Experience with Deep Learning With Our New Video Camera", AWS News Blog, Nov. 29, 2017, 11 pages.
Coberly, "Apple patent filing reveals potential whispering Siri functionality", Techspot, Dec. 14, 2017, 4 pages.
Estes, "Amazon's Newest Gadget Is a Tablet That's Also an Echo", Gizmodo, Sep. 19, 2017, 3 pages.

(56) References Cited

OTHER PUBLICATIONS

Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Heater, "Amazon Alexa devices can finally tell voices apart", TechCrunch, Oct. 11, 2017, 6 pages.
International Search Report and Written Opinion on International Application No. PCT/US2017/049782, dated Oct. 25, 2017, 16 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Lee, Take Two for Samsung's troubled Bixby assistant, BBC News, Oct. 19, 2017, 6 pages.
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Notice of Allowance for U.S. Appl. No. 13/441,298 dated Nov. 2, 2017, 11 pages.
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Perez, "Alexa's 'Routines' will combine smart home control with other actions, like delivering your news and weather", TechCrunch, Sep. 28, 2017, 10 pages.
Pringle, "'I'm sorry to hear that': Why training Siri to be a therapist won't be easy", CBC News, Sep. 24, 2017, 3 pages.
Unknown Author, "'Dolphin' attacks fool Amazon, Google voice assistants", BBC News, Sep. 7, 2017, 8 pages.
U.S. Notice of Allowance for U.S. Appl. No. 13/478,998 dated Jan. 26, 2018, 8 pages.
U.S. Office Action for U.S. Appl. No. 13/840,380 dated Dec. 6, 2017, 13 pages.
U.S. Appl. No. 95/001,061, Reexamination of Stone et al.
U.S. Appl. No. 95/001,068, Reexamination of Stone et al.
U.S. Appl. No. 95/001,069, Reexamination of Stone et al.
U.S. Appl. No. 95/001,073, Reexamination of Stone et al.
"Amazon and Google Want to Turn Their Smart Home Speakers Into Telephone Replacements—Mac Rumors" MacRumors, 9 pages.
"Apple Patent Reveals a New Security Feature Coming to Siri" 6 pages.
Best practices for creating adaptive user interfaces with the mobile Internet toolkit:, Microsoft Corporation, Jan. 2002, pp. 1-2. Downloaded Dec. 21, 2006 from http://msdn.microsoft.com/library/default.asp?url=/library/en-_us/dnmitta/html/bestpractaui.asp.
"eStara Push to Talk: The most popular click to call service in the world," downloaded from htto://www.estara.com on Jun. 29, 2004, 2 pgs.
"Ingenio: Click to Call Solutions," downloaded fromhtto://www.in2enio.com/documents/cominfo/clicktocall.aso?TF=1 on Jun. 29, 2004, 3 pgs.
"Introducing Echo Look Hands-Free Camera and Style Assistant" 1996-2017, Amazon.com, Inc. 5 pages.
"The Patent Behind Google Home's New Feature of Understanding Different Voices in the Home Surfaced Today", Apr. 20, 2017, 5 pages.

AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Broussard, Mitchel, "Chatbot-Like Siri Patent Includes Intelligent Image, Video, and Audio Recognition Within Messages", MacRumors, May 11, 2017, 11 pages.
Business Wire, "Global Network, Inc. Enters Into Agreement in Principle With Major Advertising Agency," Oct. 4, 1999.
Canadian Office Action on 2572468 dated Dec. 4, 2014.
Canadian Office Action on 2572468 dated Sep. 17, 2013.
Canadian Office Action on 2572471 dated Jan. 9, 2014.
Canadian Office Action on CA 2,572,471 dated Mar. 3, 2015.
Canadian Office Action to Canadian Patent Application No. 2,572,471 dated Mar. 16, 2009.
Chapter 12, Managing the Product, Class Notes, University of Delaware, http://www.udel.edu/alex/chapt12.html, accessed Mar. 13, 2015, 10 pgs.
Chen, Yilun Lulu, "Alibaba Challenges Google, Amazon With New Echo-Like Device", Bloomberg, Jul. 5, 2017, 3 pages.
Close, "Amazon Echo Will Give You These Deals If You Order Through Alexa This Weekend," Web Article, Nov. 18, 2016, Time.com (2 pages).
Collins, Terry "Can Twitter Save itself? The Social Network is Slowly gaining users, but still Lags Far Behind Rivals. Is a Turnaround Possible?" 3 pages.
Cook, "A Siri for advertising: These mobile ads talk back to you," Web Article, Apr. 1, 2013, Geekwire.com (7 pages).
Decision of Rejection for Japanese Patent Application No. 2007-519374, dated Jun. 15, 2010 (3 pgs.) with translation (3 pgs.).
Decision of Rejection for Japanese Patent Application No. 2007-519407 dated Feb. 23, 2010.
Decision to Dismiss the Amendment for Korean Patent Application No. 10-2007-7002383 dated Jul. 9, 2010.
Dedrick, R., A Consumption Model for Targeted Electronic Advertising, Intel Architecture Labs, IEEE, 1995.
Dedrick, R., Interactive Electronic Advertising, IEEE, 1994.
Dickinger et al., "An Investigation and Conceptual Model of SMS Marketing," Proceedins of the 37th Hawaii International Conference on System Sciences, 2004, 10 pages.
European Office Action for EP Application No. 05763971.8, dated Mar. 29, 2011.
European Office Action on 05768157.9 dated Jan. 27, 2014.
European Office Action on EP 05 768 157.9 dated Aug. 21, 2014.
European Office Action on EP 05 768 157.9 dated Jul. 23, 2015.
Examiner's First Report on Australian Patent Application No. 2005259861 dated Mar. 6, 2008 (2 pgs.).
Examiner's First Report to Australian Patent Application No. 2005260566 dated Mar. 4, 2008.
Examiner's Re-Examination Report for Australian Patent Application No. 2005259861, dated Dec. 1, 2011 (2 pgs.).
Examiner's Report for Canadian Patent Application No. 2,572,468, dated Dec. 29, 2011 (4 pgs.).
First Examination Report for Indian Patent Application No. 144/MUMNP/2007, dated Jun. 19, 2008 (2 pgs.).
First Office Action for Japanese Patent Application No. 2010-142707 dated Nov. 13, 2012.
First Office Action for Japanese Patent Application No. 2010-232591, dated Feb. 19, 2013 (3 pgs.) with translation (4 pgs.).
Forrest, Conner, "Essential Home wants to be 'bridge' between Amazon Alexa, Apple's Siri, and Google Assistant," TechRepublic, May 31, 2017, 9 pages.
Foxx, Chris, "Apple reveals HomePod smart speaker", BBC, Jun. 5, 2017, 9 pages.

(56) References Cited

OTHER PUBLICATIONS

Gebhart, Andrew, "Google Assistant is spreading, but it needs its own 'Echo Dot'", Cnet, May 20, 2017, 6 pages.
Gebhart, Andrew, "Google Home to the Amazon Echo: 'Anything you can do . . . '" Cnet, May 18, 2017, 7 pages.
Golgowski, Nina, "This Burger King Ad Is Trying to Control Your Google Home Device", Apr. 12, 2017, 7 pages.
Google Developers Newsletter "Google Assistant SDK", developers.google.com, 2 pages.
Gurma, Mark and Webb, Alex, "Apple Is Manufacturing a Siri Speaker to Outdo Google and Amazon", Bloomberg, May 31, 2017, 3 pages.
Information Access Technologies, Inc., Aaddzz brochure, "The Best Way to Buy and Sell Web Advertising Space," © 1997.
Information Access Technologies, Inc., Aaddzz.com website archive from www.Archive.org, archived on Jan. 30, 1998.
International Search Report & Written Opinion on PCT/US2013/042376 dated Feb. 28, 2014.
Japanese Decision of Rejection on 2010-232591 dated Jan. 27, 2014.
Japanese Office Action issued in JP application 2010-142707 dated Jul. 23, 2013.
Japanese Office Action on JP 2014-010608 dated Nov. 18, 2014, 12 pages (English translation).
Japanese Office Action on JP2010-232591 dated Jun. 9, 2015.
Jones, Matt et al., "Improving Web Interaction in Small Displays", Computer Networks, vol. 31, pp. 1129-1137 (May 17, 1999).
Kato, Sako, "Keyword Advertisement", Internet Magazine, 2nd Stage, No. 2,pp. 112-123, Japan, Impress Holdings, Inc. (May 1, 2004).
Koetsier, John, "Ads on Amazon Echo: Wendy's, ESPN, and Progressive Among Brands Testing", Forbes, May 11, 2017, 3 pages.
Larson, Selena "Google Home Now Recognizes your Individual Voice" dated Apr. 20, 2017, 3 pages.
Lee, Dave, "The five big announcements from Google I/O", BBC, May 18, 2017, 11 pages.
Microsoft Corporation, "Best Practices for Creating Adaptive User Interfaces with the Mobile Internet Toolkit", Jan. 2002, pp. 1-2, XP008144654.
Morton to Baluja email (1 pg).
Nieva, Richard, "Google Home and eBay can tell you how much that's worth", 3 pages.
Notice of Final Rejection for Korean Patent Application No. 10-2007-7002383 dated Apr. 22, 2010.
Notice of Final Rejection for Korean Patent Application No. 10-2007-7002385 dated Jul. 30, 2009 (5 pgs.) with translation (5 ps.).
Notice of Final Rejection for Korean Patent Application No. 10-2010-7013914 dated Sep. 14, 2011.
Notice of Preliminary Rejection for Korean Patent Application No. 10-2007-7002383 dated Jun. 10, 2008.
Notice of Preliminary Rejection for Korean Patent Application No. 10-2007-7002385, dated Jun. 10, 2008 (5 pgs.) with translation (6 pgs.).
Notice of Preliminary Rejection for Korean Patent Application No. 10-2010-7013914, dated Sep. 17, 2010.
Notice of Reasons for Rejection for Japanese Patent Application No. 2007-519374 dated Aug. 25, 2009 (3 pgs.) with translation (4 pgs.).
Notice of Reasons for Rejection for Japanese Patent Application No. 2007-519407 dated Jul. 7, 2009.
Notification of Preliminary Rejection for Korean Patent Application No. 10-2007-7002383 dated Jun. 10, 2009.
Notification of the First Office Action for Chinese Patent Application No. 200580025826.2 dated Dec. 18, 2009 (6 pgs.) with translation (7 pgs.).
Notification of the Second Office Action for Chinese Patent Application No. 200580025826.2, dated Jul. 22, 2011 (3 pgs.) with translation (4 pgs.).
Notification of the Second Office Action for Chinese Patent Application No. 200580025878.X, dated Oct. 26, 2011.
Notification of the Third Office Action for Chinese Patent Application No. 200580025826.2 dated Apr. 11, 2012 (5 pgs.) with translation (7 pgs.).
Notification of the Third Office Action for Chinese Patent Application No. 200580025878.X, dated Feb. 21, 2012.
Office Action for Canadian Patent Application No. 2,572,471, dated May 21, 2010.
Office Action for Chinese Patent Application No. 200580025878.X, dated May 7, 2010.
Office Action for European Patent Application No. 05 763 971.8-2221 dated Mar. 29, 2011 (4 pgs.).
Office Action for European Patent Application No. 05768157.9-1958, dated Feb. 15, 2013.
Office Action for Japanese Patent Application No. 2007-519374, dated May 29, 2012 (19 pgs.) with translation (28 pgs.).
Office Action on U.S. Appl. No. 14/230,508 dated Nov. 28, 2014.
Official Letter of Inquiry for Japanese Patent Application No. 2007-519374 dated Oct. 4, 2011 (3 pgs.).
Page to Karima email (1 page).
PCT International Search Report (PCT/ISA/210) for International Application No. PCT/US05/23023 (2 pgs.) (dated Oct. 23, 2006).
PCT Written Opinion of the International Searching Authority (PCT/ISA/237) for International Application No. PCT/US05/23023 (3 pgs.).
PCT/ISA/210, International Search Report for PCT/US05/23162 dated Feb. 5, 2007.
PCT/ISA/237, Written Opinion of the International Searching Authority forPCT/US05/23162 dated Feb. 5, 2007.
Perez, Sarah, "The first ad network for Alexa Skills shuts down following Amazon's policy changes", Tech Crunch, Jun. 15, 2017, 8 pages.
Porter, Jon, "Amazon Echo Show release date, price, news and features", Tech Radar, Jun. 26, 2017, 11 pages.
Purcher, Jack, Today Google Home's Virtual Assistant can learn its Owner's voice for Security Reasons like Apple's Patent Pending Idea, Apr. 20, 2017, 4 pages.
Request for Reexamination of U.S. Pat. No. 6,446,045 B1, Control No. 95/001,061.
Request for Reexamination of U.S. Pat. No. 6,829,587 B2, Control No. 95/001,068.
Request for Reexamination of U.S. Pat. No. 7,240,025 B2, Control No. 95/001,073.
Request for Reexamination of U.S. Pat. No. 7,249,059 B2, Control No. 95/001,069.
Sablich, Justin, "Planning a Trip With the Help of Google Home", New York Times, dated May 31, 2017, 6 pages.
Seifert, Dan "Samsung's New Virtual Assistant Will Make Using Your Phone Easier", Mar. 20, 2017, 7 pages.
Sherr, Ian "IBM Built a Voice Assistant for Cybersecurity" dated Feb. 13, 2017, 4 pages.
Shintaro Gotoh et al., "Citizens Lectures on GIS using MANDARA and EXCEL, Make a Map by PC," Kokin Shoin (1st ed., Apr. 5, 2004, ISBN 4-7722-4051-9, Kokon, Japan) p. 62.
Siegal, Daniel, "IP Attys Load Up Apps' Legal Challenges at Silicon Beach" 6 pages.
Simonite, "How Alexa, Siri, and Google Assistant Will Make Money off You," Web Article, May 31, 2016, technologyreview.com (11 pages).
Simonite, "How Assistant Could End Up Eating Google's Lunch," Web Article, Sep. 23, 2016, technologyreview.com (9 pages).
Smith, Dave, "The Amazon Echo got 2 incredibly useful features thanks to a new update", Business Insider, Jun. 1, 2017, 2 pages.
Statement of Grounds and Particulars in Support of Opposition for Australian Patent Application No. 2005259861, dated Jan. 22, 2010 (13 pgs.).
Supplementary European Search Report for European Patent Application No. 05768157.9 dated Oct. 31, 2012.
Tedeschi, Bob, "Transforming Clicks Into Rings," (Jun. 7, 2004) downloaded fromwww.nvtimes.com on Jun. 6, 2004, 3 pgs.
The International Search Report and the Written Opinion of the International Searching Authority for Application No. PCT/US2013/077834 dated Apr. 24, 2014, 5 pages.

(56) References Cited

OTHER PUBLICATIONS

U.S. Final Office Action on U.S. Appl. No. 13/441,298 dated Dec. 30, 2013.
U.S. Office Action on U.S. Appl. No. 10/880,686 dated May 7, 2008.
U.S. Office Action on U.S. Appl. No. 10/880,868 dated Apr. 1, 2016.
U.S. Office Action on U.S. Appl. No. 10/880,868 dated Dec. 4, 2008.
U.S. Office Action on U.S. Appl. No. 10/880,868 dated Mar. 24, 2015.
U.S. Office Action on U.S. Appl. No. 10/880,868 dated Nov. 28, 2014.
U.S. Office Action on U.S. Appl. No. 11/026,507 dated Apr. 6, 2015.
U.S. Office Action on U.S. Appl. No. 11/026,507 dated Aug. 14, 2014.
U.S. Office Action on U.S. Appl. No. 11/026,507 dated Jan. 12, 2010.
U.S. Office Action on U.S. Appl. No. 11/026,507 dated Jul. 21, 2010.
U.S. Office Action on U.S. Appl. No. 11/026,507 dated Mar. 24, 2011.
U.S. Office Action on U.S. Appl. No. 11/026,507 dated Mar. 30, 2009.
U.S. Office Action on U.S. Appl. No. 11/026,507 dated Oct. 29, 2015.
U.S. Office Action on U.S. Appl. No. 13/441,298 dated Jul. 17, 2013.
U.S. Office Action on U.S. Appl. No. 13/441,298 dated Jul. 6, 2015.
U.S. Office Action on U.S. Appl. No. 13/441,298 dated Nov. 20, 2015.
U.S. Office Action on U.S. Appl. No. 13/441,298 dated Jan. 13, 2017.
U.S. Office Action on U.S. Appl. No. 13/478,998 dated Jul. 31, 2015.
U.S. Office Action on U.S. Appl. No. 13/478,998 dated Feb. 27, 2017.
U.S. Office Action on U.S. Appl. No. 13/478,998 dated Jan. 20, 2016.
U.S. Office Action on U.S. Appl. No. 13/478,998 dated Oct. 5, 2016.
U.S. Office Action on U.S. Appl. No. 13/840,380 dated Oct. 22, 2015.
U.S. Office Action on U.S. Appl. No. 13/840,380 dated Aug. 12, 2016.
U.S. Office Action on U.S. Appl. No. 13/840,380 dated Feb. 27, 2017.
U.S. Office Action on U.S. Appl. No. 14/155,323 dated May 7, 2015.
U.S. Office Action on U.S. Appl. No. 14/172,353 dated Jul. 6, 2015.
U.S. Office Action on U.S. Appl. No. 14/172,353 dated Feb. 9, 2017.
U.S. Office Action on U.S. Appl. No. 14/172,353 dated Jan. 21, 2016.
U.S. Office Action on U.S. Appl. No. 14/230,508 dated Feb. 1, 2016.
U.S. Office Action on U.S. Appl. No. 14/230,508 dated Jun. 3, 2015.
Willens, Max, "For publishers, Amazon Alexa holds promise but not much money (yet)", Digiday, Jul. 6, 2017, 5 pages.
Zeff, R. et al., Advertising on the Internet, 2nd Ed., John Wiley & Sons, 1999.
U.S. Notice of Allowance on U.S. Appl. No. 13/478,998 dated Sep. 12, 2017.
U.S. Office Action on U.S. Appl. No. 15/395,703 dated Oct. 19, 2017.
Buckland et al., "Amazon's Alexa Takes Open-Source Route to Beat Google Into Cars", Bloomberg, Feb. 27, 2018, 6 pages.
International Preliminary Report on Patentability (Chapter 1 of the Patent Cooperation Treaty) for application No. 31549-00189 dated Aug. 13, 2015.
Final Office Action on U.S. Appl. No. 13/840,380 dated Aug. 3, 2018.
Final Office Action on U.S. Appl. No. 14/172,353 dated Dec. 14, 2018.
Non-Final Office Action on U.S. Appl. No. 15/189,826 dated Nov. 9, 2018.
Non-Final Office Action on U.S. Appl. No. 15/491,734 dated Jan. 30, 2019.
Non-Final Office Action on U.S. Appl. No. 15/584,970 dated Nov. 16, 2018.
Non-Final Office Action on U.S. Appl. No. 15/674,838 dated Nov. 30, 2018.
Non-Final Office Action on U.S. Appl. No. 16/039,202 dated Aug. 14, 2018.
Non-Final Office Action on U.S. Appl. No. 16/039,204 dated Aug. 15, 2018.
Notice of Allowance on U.S. Appl. No. 13/478,998 dated Sep. 21, 2018.
Notice of Allowance on U.S. Appl. No. 16/039,202 dated Dec. 10, 2018.
Notice of Allowance on U.S. Appl. No. 16/039,204 dated Dec. 10, 2018.
Notice of Allowance on U.S. Appl. No. 16/039,204 dated Jan. 17, 2019.
U.S. Notice of Allowance for U.S. Appl. No. 13/478,998 dated Apr. 23, 2018, 8 pages.
U.S. Notice of Allowance for U.S. Appl. No. 15/395,703 dated Apr. 4, 2018, 2 pages.
U.S. Notice of Allowance for U.S. Appl. No. 15/395,703 dated Feb. 14, 2018, 9 pages.
U.S. Notice of Allowance on U.S. Appl. No. 15/395,703 dated May 17, 2018.
U.S. Office Action for U.S. Appl. No. 14/172,353 dated Apr. 4, 2018, 22 pages.
U.S. Office Action on U.S. Appl. No. 14/172,353 dated May 17, 2018.
International Preliminary Report on Patentability for Appl. Ser. No. PCT/US2017/049782 dated Jul. 11, 2019 (12 pages).
U.S. Notice of Allowance for U.S. Appl. No. 16/039,202 dated Jul. 17, 2019 (8 pages).
U.S. Notice of Allowance for U.S. Appl. No. 16/039,204 dated Jul. 15, 2019 (8 pages).
U.S. Office Action for U.S. Appl. No. 15/491,734 dated May 28, 2019 (24 pages).
U.S. Office Action for U.S. Appl. No. 15/674,838 dated Jun. 10, 2019 (6 pages).
"An Investigation of Conceptual Model of SMS Marketing", Dickinger A. and Haghirian P., Proceedings of 37th Hawaii International Conference on System Sciences, Jan. 2004, p. 8 paragraph 6.3.2 (Year:2004).
"How to Deep Link to Alexa Skills" dtd Oct. 11, 2017.
Final Office Action on U.S. Appl. No. 15/189,826 dated Jun. 3, 2019.
Final Office Action on U.S. Appl. No. 15/491,734 dated May 28, 2019.
Final Office Action on U.S. Appl. No. 15/584,970 dated May 31, 2019.
Korean Office Action for application No. 10-2017-7031603 dated Jan. 22, 2019.
Non-Final Office Action on U.S. Appl. No. 15/084,223 dated Sep. 4, 2018.
Notice of Allowance on U.S. Appl. No. 13/840,380 dated May 14, 2019.
Notice of Allowance on U.S. Appl. No. 16/039,202 dated Apr. 4, 2019.
Notice of Allowance on U.S. Appl. No. 16/039,204 dated Mar. 20, 2019.
Notice of Reasons for Rejection for application No. 2017-556912 dated Mar. 4, 2019.
JP Notice of Allowance for Appln. Ser. No. 2017-556912 dated Aug. 9, 2019 (6 pages).
Non-Final Office Action on U.S. Appl. No. 15/638,291 dated Sep. 6, 2019 (22 pages).
Non-Final Office Action on U.S. Appl. No. 15/638,295 dated Sep. 6, 2019 (26 pages).
Examination Report for AU Appln. Ser. No. 2017384996 dated Nov. 25, 2019 (2 pages).

(56) References Cited

OTHER PUBLICATIONS

Non-Final Office Action for U.S. Appl. No. 10/880,868 dated Sep. 23, 2009 (7 pages).
Notice of Allowance for KR Appln. Ser. No. 10-2019-7018803 dated Oct. 11, 2019 (3 pages).
Notice of Allowance for U.S. Appl. No. 13/840,380 dated Dec. 11, 2019 (12 pages).
Notice of Allowance for U.S. Appl. No. 15/674,838 dated Dec. 3, 2019 (2 pages).
95/001,061 Reexamination—Miscellaneous Action dated Jul. 2, 2013 (4 pages).
95/001,061 Reexamination—Reexamination Terminated dated Jul. 2, 2013 (4 pages).
95/001,068 Reexamination—"Certificate of Service" dated Mar. 24, 2012 (1 page).
95/001,068 Reexamination—"Inter Partes Reexamination Certificate" for U.S. Pat. No. 6,829,587-C1 dated Jan. 8, 2013 (2 pages).
95/001,068 Reexamination—Appeal No. 2011-013241, "Decision on Appeal" dated Jan. 27, 2012 (34 pages).
95/001,068 Reexamination—Appeal No. 2011-013241, "Notice of Appeal" dated Mar. 24, 2012 (3 pages).
95/001,068 Reexamination—Case 12-1379, Document 20, "Order" by the US Court of Appeals for the Federal Circuit dated Sep. 6, 2012 (2 pages).
95/001,069 Reexamination—"Certificate of Service" dated Mar. 24, 2012 (1 page).
95/001,069 Reexamination—"Inter Partes Reexamination Certificate" for U.S. Pat. No. 7,249,059-C1 dated Jul. 23, 2013 (2 pages).
95/001,069 Reexamination—Appeal No. 2011-010893, "Decision on Appeal" dated Jan. 27, 2012 (34 pages).
95/001,069 Reexamination—Appeal No. 2011-010893, "Notice of Appeal" dated Mar. 24, 2012 (3 pages).
95/001,069 Reexamination—Case 12-1380, Document 54-1, Decision by the US Court of Appeals for the Federal Circuit dated Mar. 7, 2013 (8 pages).
95/001,069 Reexamination—Case 12-1380, Document 54-2, "Information Sheet" dated Mar. 7, 2013 (1 page).
95/001,069 Reexamination—Case 12-1380, Document 54-3, "Questions and Answers: Petitions for Panel Rehearing (Fed. Cir. R. 40) and Petitions for Hearing or Rehearing En Banc (Fed. Cir. R. 35)" dated Mar. 7, 2013 (1 page).
95/001,069 Reexamination—Case 12-1380, Document 54-4, "Notice of Entry of Judgment Accompanied by Opinion" dated Mar. 7, 2013 (2 pages).
95/001,069 Reexamination—Case 12-1380, Document 55-3, "Mandate" dated Apr. 29, 2013 (2 pages).
95/001,073 Reexamination—"Certificate of Service" dated Mar. 24, 2012 (1 page).
95/001,073 Reexamination—"Inter Partes Reexamination Certificate" for U.S. Pat. No. 7,240,025-C1 dated Jul. 23, 2013 (2 pages).
95/001,073 Reexamination—Appeal No. 2011-010719, "Decision on Appeal" dated Jan. 27, 2012 (27 pages).
95/001,073 Reexamination—Appeal No. 2011-010719, "Notice of Appeal" dated Mar. 24, 2012 (3 pages).
95/001,073 Reexamination—Case 12-1380, Document 54-1, Decision by the US Court of Appeals for the Federal Circuit dated Mar. 7, 2013 (8 pages).
95/001,073 Reexamination—Case 12-1380, Document 55-3, "Mandate" by the US Court of Appeals for the Federal Circuit dated Apr. 29, 2013 (2 pages).
Final Office Action for U.S. Appl. No. 10/880,868 dated Apr. 13, 2010 (8 pages).
Final Office Action for U.S. Appl. No. 10/880,868 dated Jul. 17, 2009 (7 pages).
Fisher et al., "The Role of Text Analytics and Information Retrieval in the Accounting Domain," Journal of Emerging Technologies in Accounting, vol. 7, Dec. 2010 (25 pages).
Non-Final Office Action for U.S. Appl. No. 15/638,291 dated Sep. 6, 2019 (22 pages).
Non-Final Office Action for U.S. Appl. No. 15/638,295 dated Sep. 6, 2019 (26 pages).
Non-Final Office Action for U.S. Appl. No. 13/840,380 dated Mar. 26, 2015 (26 pages).
Notice of Allowance for JP 2017-556912 dated Aug. 9, 2019 (8 pages).
Notice of Allowance for KR 10-2017-7031603 dated Mar. 28, 2019 (3 pages).
Notice of Allowance for U.S. Appl. No. 13/840,380 dated Sep. 20, 2019 (11 pages).
Notice of Allowance for U.S. Appl. No. 15/674,838 dated Sep. 20, 2019 (8 pages).
Notice of Allowance for U.S. Appl. No. 16/039,202 dated Oct. 9, 2019 (8 pages).
Notice of Allowance for U.S. Appl. No. 16/039,204 dated Oct. 30, 2019 (8 pages).
Xue et al., "Unstructured Queries Based on Mobile User Context," International Journal of Pervasive Computing and Communications, vol. 8, No. 4, dated Aug. 27, 2012 (28 pages).
"Wiley Encyclopedia of Computer Science and Engineering: vol. I", Wiley-Interscience, Nov. 2008 (2365 pages).
Feng et al., "Active Profiling of Physical Devices at Internet Scale", IEEE, 2016 (9 pages).
Final Office Action for U.S. Appl. No. 15/638,291 dated Jan. 30, 2020 (24 pages).
Final Office Action for U.S. Appl. No. 15/638,295 dated Jan. 30, 2020 (25 pages).
Non-Final Office Action for U.S. Appl. No. 15/587,132 dated Mar. 5, 2020 (24 pages).
Non-Final Office Action for U.S. Appl. No. 16/666,780 dated Jan. 27, 2020 (10 pages).
Notice of Allowance for U.S. Appl. No. 15/491,734 dated Jan. 31, 2020 (18 pages).
Notice of Allowance for U.S. Appl. No. 15/638,298 dated Feb. 21, 2020 (15 pages).
Notice of Allowance for U.S. Appl. No. 15/674,838 dated Mar. 11, 2020 (8 pages).
Notice of Allowance for U.S. Appl. No. 16/666,780 dated Apr. 14, 2020 (6 pages).

\* cited by examiner

SECONDARY TRANSMISSIONS OF PACKETIZED DATA

CROSS-REFERENCE TO RELATED APPLICATION

This application claims priority and benefit under 35 U.S.C. § 120 as a continuation-in-part of U.S. patent application Ser. No. 13/840,380 filed Mar. 15, 2013, which claims priority and benefit under 35 U.S.C. § 119 to U.S. Provisional Patent Application No. 61/758,979 filed Jan. 31, 2013. This application also claims priority and benefit under 35 U.S.C. § 120 as a continuation-in-part of U.S. patent application Ser. No. 15/395,703 filed on Dec. 30, 2016. The contents of the foregoing applications are incorporated herein by reference in their entirety.

BACKGROUND

Excessive network transmissions, packet-based or otherwise, of network traffic data between computing devices can prevent a computing device from properly processing the network traffic data, completing an operation related to the network traffic data, or timely responding to the network traffic data. The excessive network transmissions of network traffic data can also complicate data routing or degrade the quality of the response if the responding computing device is at or above its processing capacity, which may result in inefficient bandwidth utilization. The control of network transmissions corresponding to content item objects can be complicated by the large number of content item objects that can initiate network transmissions of network traffic data between computing devices.

SUMMARY

According to one aspect of the disclosure a system to transmit packetized data in a voice activated computer network environment can include a data processing system. The data processing system can include a processor and a memory. The data processing system can receive, via an interface, data packets that can include an input audio signal detected by a sensor of a client computing device. The data processing system can identify a first request within the input audio signal detected by the sensor of the client computing device. The data processing system can determine, based on the first request, a primary search result having a primary digital component and a secondary search result URL related to the primary search result. The data processing system can identify a plurality of canonicalized digital components associated with the secondary search result URL. The data processing system can calculate a respective score for each of the plurality of canonicalized digital components. The data processing system can select one of the plurality of canonicalized digital components based on the respective score for each of the plurality of canonicalized digital components and a filter rule. The data processing system can transmit a primary output audio signal comprising the primary digital component. The data processing system can transmit a secondary output signal comprising the selected one of the plurality of canonicalized digital components.

According to another aspect of the disclosure, a method of data transmission in a voice activated computer network environment can include receiving, via an interface, data packets comprising an input audio signal detected by a sensor of a client computing device. The method can include identifying a first request within the input audio signal detected by the sensor of the client computing device. The method can include determining, based on the first request, a primary search result having a primary digital component and a secondary search result URL related to the primary search result. The method can include identifying a plurality of canonicalized digital components associated with the secondary search result URL. The method can include calculating a respective score for each of the plurality of canonicalized digital components. The method can include selecting one of the plurality of canonicalized digital components based on the respective score for each of the plurality of canonicalized digital components and a filter rule. The method can include transmitting a primary output audio signal comprising the primary digital component. The method can include transmitting a secondary output signal comprising the selected one of the plurality of canonicalized digital components.

Figure 1:
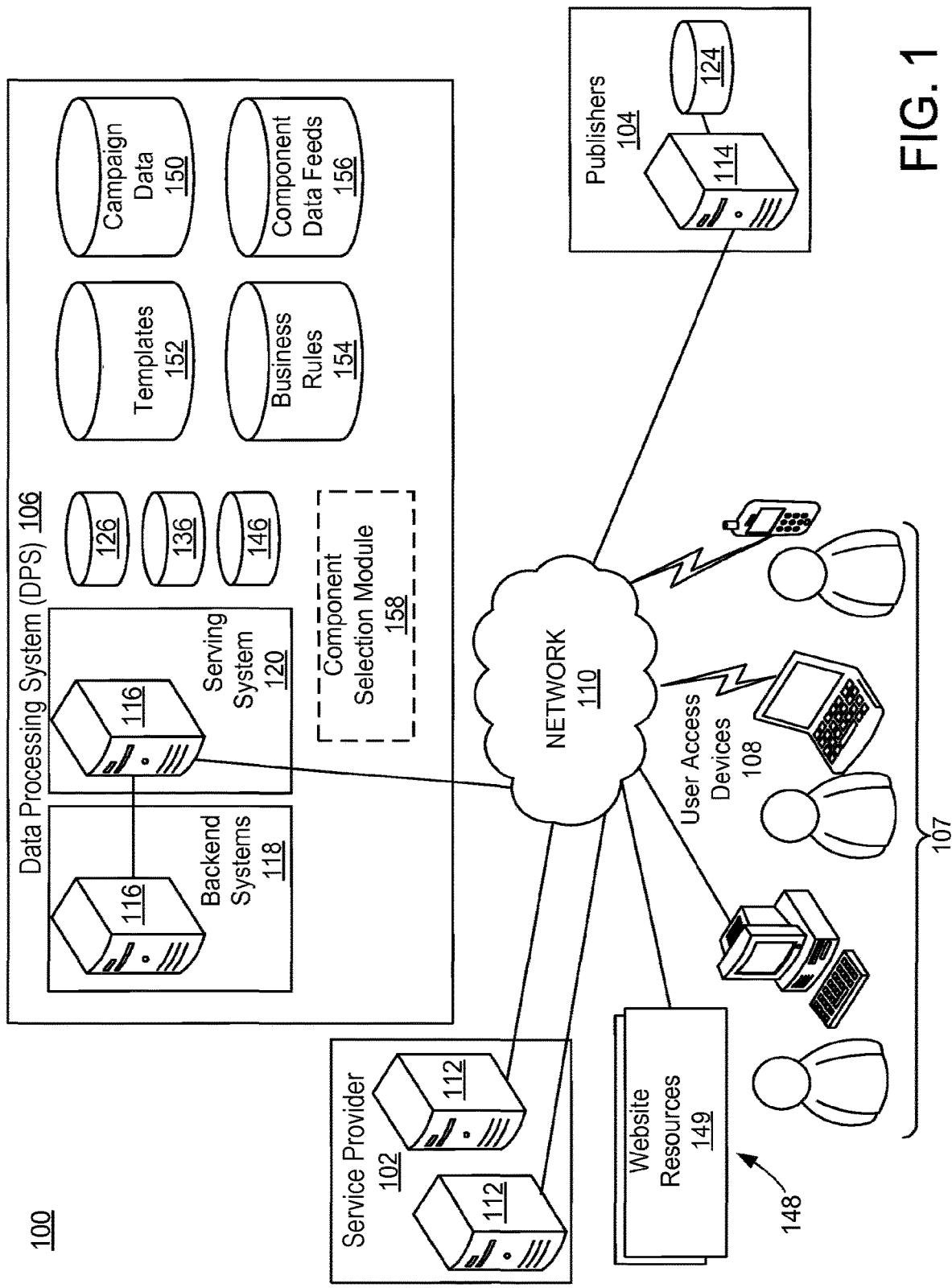
FIG. 1 is a block diagram depicting an example environment.

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

Following below are more detailed descriptions of various concepts related to, and implementations of, methods, apparatuses, and systems for multi-modal transmission of packetized data in a voice activated data packet based computer network environment. The various concepts introduced above and discussed in greater detail below may be implemented in any of numerous ways.

Systems and methods of the present disclosure relate generally to a data processing system that identifies an optimal transmission modality for data packet (or other protocol based) transmission in a voice activated computer network environment. The data processing system can improve the efficiency and effectiveness of data packet transmission over one or more computer networks by, for example, selecting a transmission modality from a plurality of options for data packet routing through a computer network of content items to one or more client computing device, or to different interfaces (e.g., different apps or programs) of a single client computing device. Data packets or other protocol based signals corresponding to the selected operations can be routed through a computer network between multiple computing devices. For example the data processing system can route a content item to a different interface than an interface from which a request was received. The different interface can be on the same client computing device or a different client computing device from which a request was received. The data processing system can select at least one candidate interface from a plurality of candidate interfaces for content item transmission to a client computing device. The candidate interfaces can be determined based on technical or computing parameters such as processor capability or utilization rate, memory capability or availability, battery status, available power, network bandwidth utilization, interface parameters or other resource utilization values. By selecting an interface to receive and provide the content item for rendering from the client computing device based on candidate interfaces or utilization rates associated with the candidate interfaces, the data processing system can reduce network bandwidth usage, latency, or processing utilization or power consumption of the client computing device that renders the content item. This saves processing power and other computing resources such as memory, reduces electrical power consumption by the data processing system and the reduced data transmissions via the computer network reduces bandwidth requirements and usage of the data processing system.

The systems and methods described herein can include a data processing system that receives an input audio query, which can also be referred to as an input audio signal. From the input audio query the data processing system can identify a request and a trigger keyword corresponding to the request. Based on the trigger keyword or the request, the data processing system can generate a first action data structure. For example, the first action data structure can include an organic response to the input audio query received from a client computing device, and the data processing system can provide the first action data structure to the same client computing device for rendering as audio output via the same interface from which the request was received.

The data processing system can also select at least one content item based on the trigger keyword or the request. The data processing system can identify or determine a plurality of candidate interfaces for rendering of the content item(s). The interfaces can include one or more hardware or software interfaces, such as display screens, audio interfaces, speakers, applications or programs available on the client computing device that originated the input audio query, or on different client computing devices. The interfaces can include java script slots for online documents for the insertion of content items, as well as push notification interfaces. The data processing system can determine utilization values for the different candidate interfaces. The utilization values can indicate power, processing, memory, bandwidth, or interface parameter capabilities, for example. Based on the utilization values for the candidate interfaces the data processing system can select a candidate interface as a selected interface for presentation or rendering of the content item. For example, the data processing system can convert or provide the content item for delivery in a modality compatible with the selected interface. The selected interface can be an interface of the same client computing device that originated the input audio signal or a different client computing device. By routing data packets via a computing network based on utilization values associated with a candidate interface, the data processing system selects a destination for the content item in a manner that can use the least amount of processing power, memory, or bandwidth from available options, or that can conserve power of one or more client computing devices.

The data processing system can provide the content item or the first action data structure by packet or other protocol based data message transmission via a computer network to a client computing device. The output signal can cause an audio driver component of the client computing device to generate an acoustic wave, e.g., an audio output, which can be output from the client computing device. The audio (or other) output can correspond to the first action data structure or to the content item. For example the first action data structure can be routed as audio output, and the content item can be routed as a text based message. By routing the first action data structure and the content item to different interfaces, the data processing system can conserve resources utilized by each interface, relative to providing both the first action data structure and the content item to the same interface. This results in fewer data processing operations, less memory usage, or less network bandwidth utilization by the selected interfaces (or their corresponding devices) than would be the case without separation and independent routing of the first action data structure and the content item.

The subject matter described herein relates generally to online content and/or online content delivery. Specifically, the methods and systems herein enable relevant items of creative text ("creatives") stored in a content provider database to be matched with specific sitelinks. The resulting presentation to an online user, referred to as an "enhanced sitelink," provides additional relevant information regarding the sitelink. A typical content provider/content provider may have provided a content providing network or system with hundreds or thousands of creatives, each of which may be associated with one or more keywords, geographies or languages. Some of these creatives may be relevant to a set of sitelinks that the content provider may choose to add subsequently to a campaign. The sitelinks do not need to originate from or belong to the same content item campaign, content item group or other entity, as the creatives with which the sitelinks are ultimately matched, as long as the sitelinks and creatives are associated with the same content provider. From a content provider standpoint, having to manually manage and possibly duplicate the creatives for sitelinks purposes can be burdensome. Manual management of creative and sitelink matching may also create consistency issues that may arise when one of the creatives or campaigns needs to be paused or changed.

The methods and systems described herein may be implemented using computer programming or engineering techniques including computer software, firmware, hardware or any combination or subset thereof, wherein the technical effect may be achieved by performing at least one of the following steps: a) storing within a memory device a plurality of creatives, each creative being associated with a uniform resource locator (URL); b) canonicalizing each URL associated with each of the plurality of creatives; c) clustering the plurality of canonicalized URLs into creative clusters, wherein each creative cluster includes a plurality of clustered creatives each having a substantially similar canonicalized URL associated therewith; d) receiving, at the computing device, a sitelink having a sitelink URL associated therewith; e) canonicalizing the received sitelink URL; (f) matching the canonicalized sitelink URL with one of the creative clusters to generate a candidate set of creatives for the received sitelink; g) associating a selected creative from the candidate set of creatives with the received sitelink based on at least one of filter rules and a scoring methodology; h) pruning the candidate set of creatives by removing at least one of duplicate creatives and redundant creatives; i) crawling the sitelink URL with and without a URL parameter associated with the sitelink URL, comparing the landing pages, and removing the parameter from the sitelink URL when the landing pages match; j) receiving a plurality of sitelinks each having at least one URL associated therewith; k) processing webmaster supplied rules indicating the relevance of URL parameters; l) comparing contents of landing pages associated with the creative-associated URLs to identify similarities amongst the respective landing pages; m) determining an impression score which indicates a number of impressions associated with the selected creative; and n) determining an inverse-document-frequency (IDF) score indicating similarity of terms between a sitelink text and a creative text.

The following description refers to the accompanying drawings, in which, in the absence of a contrary representation, the same numbers in different drawings represent similar elements.

With reference to FIG. 1, an example content providing 100 may include one or more service providers 102, one or more publishers 104 (which can be referred to as content providers 104), a data processing system (DPS) 106, and one or more user access devices 108 (also referred to as client computing devices), used by one or more users 107. User access devices 108 may be coupled to a network 110. Each of the elements 102, 104, 106, 108 and 110 in FIG. 1 may be implemented or associated with hardware components, software components, or firmware components or any combination of such components. The elements 102, 104, 106, 108 and 110 can, for example, be implemented or associated with general purpose servers, software processes and engines, and/or various embedded systems. The elements 102, 104, 106 and 110 may serve, for example, as a content providing distribution network. While reference is made to distributing content items, the system 100 can be suitable for distributing other forms of content including other forms of sponsored content.

The service providers 102 may include any entities that are associated with online content such as content items. A content item can include a digital component. In some implementations, a digital component is a content item. In other implementations, a digital component can include a content item. A content item can refer to any form of communication in which one or more products, services, ideas, messages, people, organizations or other items are identified and promoted (or otherwise communicated). Content items are not limited to commercial promotions or other communications. A content item may be a public service announcement or any other type of notice, such as a public notice published in printed or electronic press or a broadcast. A content item may be referred to or include sponsored content.

Content items may be communicated via various mediums and in various forms. In some examples, content items may be communicated through an interactive medium, such as the Internet, and may include graphical content items (e.g., banner content items), textual content items, image content items, audio content items, video content items, content items combining one of more of any of such components, or any form of electronically delivered content item. Content items may include embedded information, such as embedded media, links, meta-information, and/or machine executable instructions. Content items could also be communicated through RSS (Really Simple Syndication) feeds, radio channels, television channels, print media, and other media.

The term "content item" can refer to both a single content item or a group of content items. Content items can include or also be referred to as creatives. Creative can refer to any entity that represents one content item impression. A content item impression refers to any form of presentation of a content item such that it is viewable/receivable by a user. In some examples, a content item impression may occur when a content item is displayed on a display device of a user access device. A content item group refers, for example, to an entity that represents a group of creatives that share a common characteristic, such as having the same content item selection and recommendation criteria. Content item groups can be used to create a content item campaign.

The service providers 102 may provide (or be otherwise associated with) products and/or services related to online content. The service providers 102 may include or be associated with, for example, retailers, wholesalers, warehouses, manufacturers, distributors, health care providers, educational establishments, financial establishments, technology providers, energy providers, utility providers, or any other product or service providers or distributors.

The service providers 102 may directly or indirectly generate maintain, review and/or analyze online content, which may be related to products or services offered by or otherwise associated with the service providers 102. The service providers 102 may include or maintain one or more processing unit 112, such as servers or embedded systems, coupled to the network 110. The service providers 102 may include or maintain one or more processes that run on one or more data processing systems.

The publishers 104 may include any entities that generate, maintain, provide, present and/or otherwise process publications in the system 100. "Publishers," in particular, includes authors of online publications, wherein authors may be individual persons, or, in the case of works made for hire, the proprietor(s) who hired the individual(s) responsible for creating the online publications. The term "publications" refers to various types of web-based and/or otherwise presented information, such as articles, discussion threads, reports, analyses, financial statements, music, video, graphics, search results, web page listings, information feeds (e.g., RSS feeds), television broadcasts, radio broadcasts, printed publications, etc.

In some implementations, the publishers 104 may have an Internet presence, such as online publication and news providers (e.g., online newspapers, online magazines, television websites, etc.), online service providers (e.g., financial service providers, health service providers, etc.), and the like. The publishers 104 can include television broadcasters, radio broadcasters, satellite broadcasters, and other publication providers. One or more of the publishers 104 may represent a publication network that is associated with the data processing system 106.

The publishers 104 may receive requests from the user access devices 108 (or other elements in the system 100) and provide or present publications to the requesting devices. The publishers may provide or present publications via various mediums and in various forms, including web based and non-web based mediums and forms. The publishers 104 may generate and/or maintain such publications and/or retrieve the publications from other network resources.

In addition to publications, the publishers 104 may be configured to integrate or combine retrieved publications with online content such as content items that are related or relevant to the retrieved content for display to users. As discussed further below, this relevant online content, such as content items, may be provided from the data processing system 106 and be combined with publications for display to users. In some examples, the publishers 104 may retrieve publications for display on a particular user access device 108 and then forward the publications to the user access device 108 along with code that causes one or more content items from the data processing system 106 to be displayed to the user. In other examples, the publishers 104 may retrieve publications, retrieve one or more relevant content items (e.g., from the data processing system 106 or the service providers 102), and then integrate the content items and the article to form a content page for display to the user.

As noted above, one or more of the publishers 104 may represent a publications network. In such an implementation, the service providers 102 may be able to present content items to users through this publications network.

The publishers 104 may include or maintain one or more processing unit 114, such as servers or embedded systems, coupled to the network 110. They may include or maintain one or more processes that run on data processing systems. In some examples, the publishers 104 may include one or more content repositories 124 for storing publications and other information.

The data processing system 106 manages online content including content items and provides various services to the service providers 102, the publishers 104, and the user access devices 108. The data processing system 106 may store online content, such as content items, in a content item repository 136 and facilitate the distribution or selective provision and recommendation of content items through the system 100 to the user access devices 108. In some configurations, the data processing system 106 may include or access functionality associated with other content provider systems.

The data processing system 106 may include one or more processing unit 116, such as servers or embedded systems, coupled to the network 110. It can also include one or more processes, such as server processes. In some examples, the data processing system 106 may include a content item serving system 120 and one or more backend processing systems 118. The content item serving system 120 may include one or more processing unit 116 and may perform functionality associated with delivering content items to publishers or user access devices. The backend processing systems 118 may include one or more processing unit 116 may perform functionality associated with identifying relevant content items to deliver, processing various rules, performing filtering processes, generating reports, maintaining accounts and usage information, and other backend system processing. The data processing system 106 can use the backend processing systems 118 and the content item serving system 120 to selectively recommend and provide relevant content items from the service providers 102 through the publishers 104 to the user access devices 108.

The data processing system 106 may include or access one or more crawling, indexing and searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

Searching modules may search information from various resources, such as the World Wide Web, publisher content, intranets, newsgroups, databases, and/or directories. The search modules may employ one or more known search or other processes to search data. In some implementations, the search modules may index crawled content and/or content received from data feeds to build one or more search indices. The search indices may be used to facilitate rapid retrieval of information relevant to a search query.

The data processing system 106 may include one or more interface or frontend modules for providing the various features to content providers, publishers, and user access devices. For example, the data processing system 106 may provide one or more publisher front-end interfaces (PFEs) for allowing publishers to interact with the data processing system 106. The data processing system 106 may also provide one or more content provider front-end interfaces (AFEs) for allowing content providers to interact with the data processing system 106. In some examples, the front-end interfaces may be configured as web applications that provide users with network access to features available in the data processing system 106.

The data processing system 106 provides various online content management features to the service providers 102. The data processing system 106 online content management features may allow users to set up user accounts, set account preferences, create content items, select keywords for content items, create campaigns or initiatives for multiple products or businesses, view reports associated with accounts, analyze costs and return on investment, selectively identify customers in different regions, selectively recommend and provide content items to particular publishers, analyze financial information, analyze content item performance, estimate content item traffic, access keyword tools, add graphics and animations to content items, etc.

The data processing system 106 may allow the service providers 102 to create content items and input keywords for which those content items will appear. In some examples, the data processing system 106 may provide content to user access devices or publishers when keywords associated with that content are included in a user request or requested content. The data processing system 106 may also allow the service providers 102 to set bids for content items. A bid may represent the maximum amount a content provider is willing to pay for each content item impression, user click-through of a content item or other interaction with a content item. A click-through can include any action a user takes to select a content item. The service providers 102 may also choose a currency and monthly budget.

The data processing system 106 may also allow the service providers 102 to view information about content item impressions, which may be maintained by the data processing system 106. The data processing system 106 may be configured to determine and maintain the number of content item impressions relative to a particular website or keyword. The data processing system 106 may also determine and maintain the number of click-throughs for a content item as well as the ratio of click-throughs to impressions.

The data processing system 106 may also allow the service providers 102 to select and/or create conversion types for content items. A "conversion" may occur when a user consummates a transaction related to a given content item. A conversion could be defined to occur when a user clicks on a content item, is referred to the content provider's web page, and consummates a purchase there before leaving that web page. In another example, a conversion could be defined as the display of a content item to a user and a corresponding purchase on the content provider's web page within a predetermined time (e.g., seven days). The data processing system 106 may store conversion data and other information in a conversion data repository 146.

The data processing system 106 may allow the service providers 102 to input description information associated with online content, such as content items. This information could be used to assist the publishers 104 in determining content items to publish. The service providers 102 may additionally input a cost/value associated with selected conversion types, such as a five dollar credit to the publishers 104 for each product or service purchased.

The data processing system 106 may provide various features to the publishers 104. The data processing system 106 may deliver content items (associated with the service providers 102) to the user access devices 108 when users access content from the publishers 104. The data processing system 106 can be configured to deliver content items that are relevant to publisher sites, site content and publisher audiences.

In some examples, the data processing system 106 may crawl publications provided by the publishers 104 and deliver content items that are relevant to publisher sites, site publications and publisher audiences based on the crawled publications. The data processing system 106 may also selectively recommend and/or provide content items based on user information and behavior, such as particular search queries performed on a search engine website, etc. The data processing system 106 may store user-related information in a general database (not shown). In some examples, the data processing system 106 can add search services (e.g., a search box) to a publisher site and deliver content items configured to provide appropriate and relevant content relative to search results generated by requests from visitors of the publisher site. A combination of these and other approaches can be used to deliver relevant content items.

The data processing system 106 may allow the publishers 104 to search and select specific products and services as well as associated content items to be displayed with publications provided by the publishers 104. For example, the publishers 104 may search through content items in the content item repository 136 and select certain content items for display with their publications.

The data processing system 106 may be configured to selectively recommend and provide content items created by the service providers 102 to the user access devices 108 directly or through the publishers 104. The data processing system 106 may selectively recommend and provide online content, such as content items, to a particular publisher 104 (as described in further detail herein) or a requesting user access device 108 when a user requests search results or loads a publication from the publisher 104.

In some implementations, the data processing system 106 may manage and process financial transactions among and between elements in the system 100. For example, the data processing system 106 may credit accounts associated with the publishers 104 and debit accounts of the service providers 102. These and other transactions may be based on conversion data, impressions information and/or click-through rates received and maintained by the data processing system 106.

The user access devices 108 may include any devices capable of receiving information from the network 110. The user access devices 108 could include general computing components and/or embedded systems optimized with specific components for performing specific tasks. Examples of user access devices include personal computers (e.g., desktop computers), mobile computing devices, cell phones, smart phones, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

system 100 further includes a website 148 including one or more resources 149 (e.g., text, images, multimedia content, and programming elements, such as scripts) associated with a domain name and hosted by one or more servers. Resources 149 can be relatively static (e.g., as in a publisher's webpage) or dynamically generated in response to user query (e.g., as in a search engine's result page).

User devices 108 can request resources 149 from a website 148. In turn, build data representing the resource 149 can be provided to the user access device 108 for presentation by the user access device 108. The build data representing the resource 149 can also include data specifying a content item slot in which content items can be presented.

When a resource 149 is requested by a user access device 108, the data processing system 106 receives a request for content items to be provided with the resource 149. The request for content items can include characteristics of the content item slots (e.g., size, web address of the resource, media type of the requested content item, etc.) that are defined for the requested resource or search results page, and can be provided to the data processing system 106.

Based on data included in the request for content items, the data processing system 106 can identify content items that are eligible to be provided in response to the request. For example, eligible content items can have characteristics matching the characteristics of available content item slots and have content item serving keywords that match the specified resource keywords or search queries.

Each service provider 102 can create one or more content item campaigns using various campaign parameters that are used to control distribution of the content provider's content items. Each content item campaign can include one or more content item groups that have modified campaign parameters that are specific to the content item group. Examples of campaign parameters can include content item serving keywords and corresponding bids, geographic or other factors used to facilitate content item serving, delivery period, publication network, keyword match type, as well as other parameters corresponding to one or more content items. The campaign data can be stored in the campaign data store 150. The data processing system 106 can retrieve the information in the campaign data store 150 when preparing a response to a content item request.

Dynamic content items are content items that are dynamically generated according to a content item template using one or more components. For example, a content item template can be a creative that specifies one or more component slots each requiring a component of a desired component type, such as a background image, a headline, a promotional slogan, a product image, a price quote, a landing page URL, a call-to-action (e.g., a message promoting a viewer action such as "Register Now!"), and so on. A component can be associated with a single component type based on the component's structural or format characteristics or the component's function in the content item template. In some implementations, a component may also be associated with various attribute values (e.g., color, font, model number, customer rating, etc.). As used in this specification, a component is a data item that has structural and format qualities meeting the specifications of a component type. Components of the same component type are interchangeable in a corresponding component slot of a content item template when constructing a content item. Content items generated using different components for the same component slots are identical except for the portions of each content item that are affected by the content and/or attributes of the different components.

Parameters related to a content item can include, for example, creative identifier, creative name, creative type, size, first line, web address of the landing page, display URL, media type, and so on. One of the creative types that a content provider can specify for a content item is the dynamic content item type. The content provider can provide a content item template as the creative, and the content item template can be selected (e.g., in the same manner as other types of creatives) to fulfill a received content item request for an available content item slot. When a content item template (or in other words, a dynamic content item creative) is selected to fulfill a content item request, a dynamic content item can be generated on-the-fly based on the content item template to fulfill the content item request.

The data processing system 106 can have access to a large number of available components of various types, for example, through a component data feed store 156. The components can have varying content. The component data feed store 156 can be provided and updated by the content provider from time to time. In some implementations, the component data feed store 156 can be linked to the content provider's product catalogs or other business data stores, such that real-time data can be made available to the data processing system 106 without active intervention by the content provider.

The data processing system 106 can select components from among the large number of components available in the component data feed store 156. The data processing system 106 can also apply the selected components to the component slots in a dynamic content item according to the specifications in a content item template selected from the content item template data store 152. Once the dynamic content item is constructed using the selected components, the dynamic content item can be provided by an data processing system to fulfill the received content item request. In some implementations, a component selection module 158 can be implemented to carry out actions related to component selection. The component selection module 158 can be part of the data processing system 106 or a standalone module in communication with the data processing system 106.

When the data processing system 106 selects components for the selected content item template in response to a received content item request, the data processing system 106 observes the business rules including the co-occurrence constraints specified for the selected content item template. The business rules can be specified by the content provider through an interface provided by the data processing system 106. The business rules can be stored in the campaign data store along with other campaign data. Alternatively, the business rules can be stored in a business rule data store 154 apart from other types of campaign data. The business rules can be campaign specific, content item group specific or content item template specific, for example.

For purposes of explanation only, certain aspects of this disclosure are described with reference to the discrete elements illustrated in FIG. 1. The number, identity and arrangement of elements in the system 100 are not limited to what is shown. For example, the system 100 can include any number of geographically-dispersed service providers 102, publishers 104 and/or user access devices 108, which may be discrete, integrated modules or distributed systems. Similarly, the system 100 is not limited to a single data processing system 106 and may include any number of integrated or distributed data processing system or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes run on separate machines or a single process running on a single machine.

A content provider can specify parameters of content item campaigns and content items through a content item management system. The or content item management system can receive content item requests from user devices and select content items according to information in the content item requests and the parameters of the content item campaigns. The content items that are delivered can include dynamically generated content items as described above.

Figure 2A:
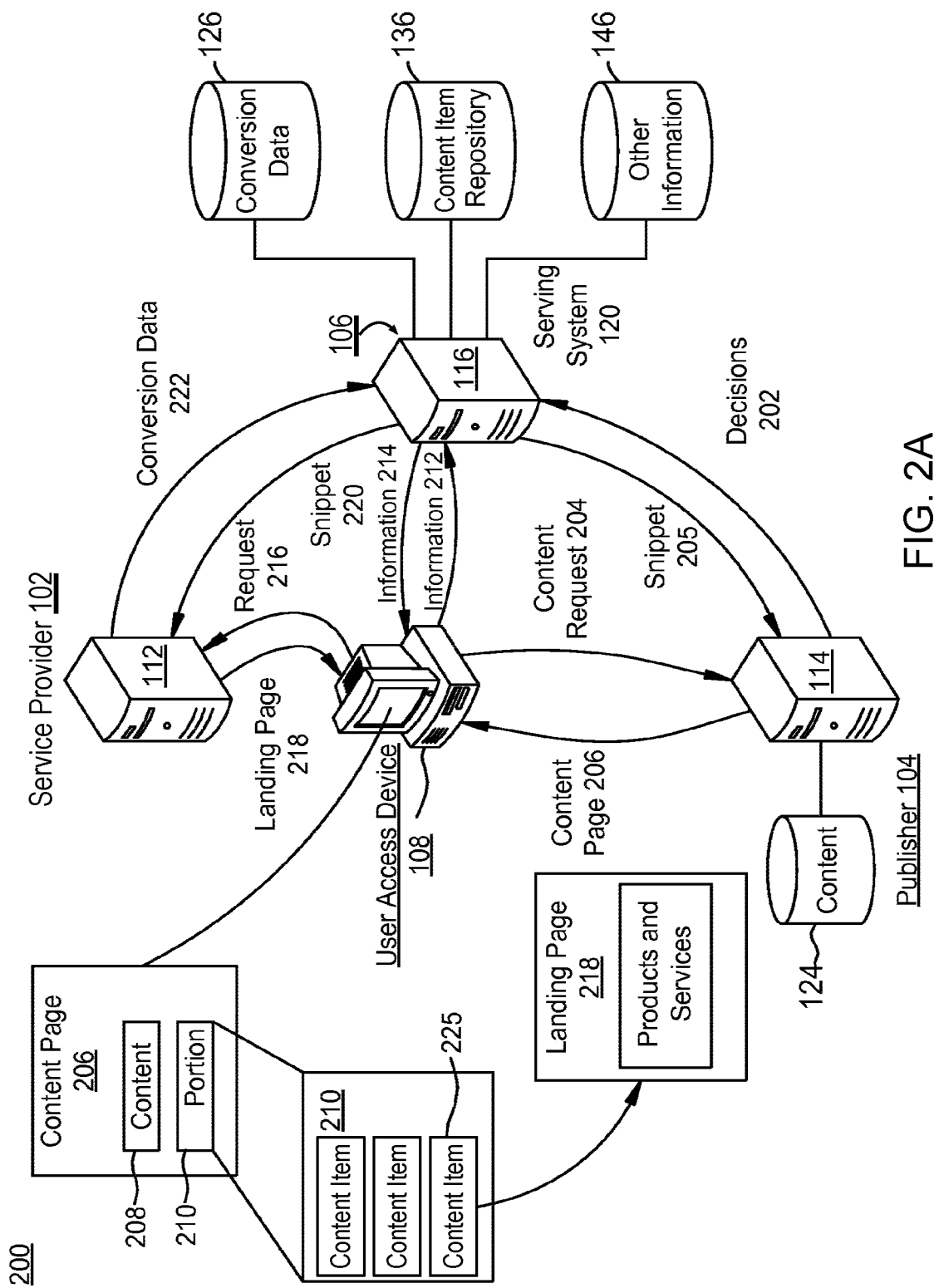
FIG. 2A is a diagram of an example serving system shown in FIG. 1, in which an aspect of the methods and systems described herein may be employed in accordance with one embodiment of the present disclosure.

FIG. 2A illustrates an example data flow 200 within the system 100. The data flow 200 is an example only and not intended to be restrictive. Other data flows may therefore occur in the system 100 and, even with the data flow 200, the illustrated events and their particular order in time may vary.

In the data flow 200, the data processing system 106 stores content items from the service providers 102 and receives content item decisions 202 from a particular publisher 104. The content item decisions 202 can include decisions to approve and/or disapprove certain content items and/or content providers. These content item decisions can be based on aggregated ratings or scores, associated with content items/content providers that are provided to the publisher 104 by the data processing system 106. Such aggregated scores can represent ratings of content items/ content providers received from multiple publishers 104.

During the data flow 200, the publisher 104 may receive a content or publication request 204 from a particular user access device 108. The content request 204 may, for example, include a request for a web document on a given topic (e.g., automobiles). In response to the content request 204, the publisher 104 may retrieve relevant publications (e.g., an automobile article) from the content repository 124 or some other source.

The publisher 104 may respond to the content request 204 by sending a content page 206 or other presentation to the requesting user access device 108. The content page 206 may include the requested content 208 (e.g., the automobile article) as well as a code "snippet" 205 associated with a content item. A code "snippet" refers, for example, to a method used by one device (e.g., a server) to ask another device (e.g., a browser running on a client device) to perform actions after or while downloading information. In some examples, a code "snippet" may be implemented in JAVASCRIPT® code or may be part of HTML (Hypertext Markup Language) or other web page markup language or content.

The data processing system 106 may provide the code snippet 205 to the publisher 104 and/or the user access device 108. The code snippet can originate and/or be provided from other sources. As the requesting user access device 108 loads the content page 206, the code snippet 205 causes the user access device 108 to contact the data processing system 106 and receive additional code (e.g., JAVASCRIPT® or the like), which causes the content page 206 to load with an portion 210.

The portion 210 may include any element that allows information to be embedded within the content page 206. In some examples, the portion 210 may be implemented as an HTML element, such an I-Frame (inline frame) or other type of frame. The portion 210 may be hosted by the data processing system 106 or the publisher 104 and may allow content (e.g., content items) from the data processing system 106 or the publisher 104 to be embedded inside the content page 206. Parameters associated with the portion 210 (e.g., its size and shape) can be specified in the content page 206 (e.g., in HTML), so that the user access device 108 can present the content page 206 while the portion 210 is being loaded. Other implementations of portion 210 may also be used.

The portion 210 may send the data processing system 106 formatting and content information 212. This information 212 may include information describing the manner (e.g., how, when, and/or where) in which content items can be rendered by the user access devices 108. The information 212 may also include content item attributes and parameters, such as size, shape, color, font, presentation style (e.g., audio, video, graphical, textual, etc.), etc. The information 212 may also specify a quantity of content items desired.

The formatting and content information 212 can include information associated with the requested content 208 displayed in content page 206. Such information may include a URL associated with the requested content page 206. The information 212 can include the requested content itself, a category corresponding to the requested publication or the content request, part or all of the content request 204, content age, content type (e.g., text, graphics, video, audio, mixed media, etc.), geo-location information, and the like.

In response to the information 212, the data processing system 106 may provide the user access device 108 with content item information 214. The content item information 214 may include one or more content items 225 for placement in the portion 210 of the content page 206. The content item information 214 may also include a signed or encoded specification of a content item.

The content item information 214 may include content items that are relevant to user interest. The data processing system 106 may retrieve and provide relevant content items based on the information 212 received from the user access device 108. The data processing system 106 may retrieve the content item information 214 from the content item repository 136 using the backend processing systems 118. The data processing system 106 may retrieve relevant content items using information from a crawling module, various keywords, various statistical associations between content items and publications, and/or preference information associated with the publishers.

The data processing system 106 may decide whether to serve certain content items with publisher content based on the content item decision 202 received from the publisher 104. For example, the data processing system 106 may identify a relevant content item from the content item repository 136 based on keywords but may decide that the content item should not be served with the publisher content (e.g., the requested automobile document) because the publisher 104 has indicated in the content item decisions 202 a disapproval of the identified content item. In some examples, these content item serving decisions may be based on rules maintained by the backend processing systems 118.

The portion 210 may populate with content items included in the content item information 214, such as content items 225. The portion 210 and the displayed content items 225 may occupy a portion of the content page 206, which may be distinct from other content (e.g., the requested content 208) in the content page 206.

When a user clicks on the displayed content item 225, an embedded code snippet may direct the user access device 108 to contact the data processing system 106. During this event, the user access device 108 may receive an information parcel, such as a signed browser cookie, from the data processing system 106. This information parcel can include information, such as an identifier of the selected content item 225, an identifier of the publisher 104, and the date/time the content item 225 was selected by the user. The information parcel may facilitate processing of conversion activities or other user transactions.

The user access device 108 may then be redirected to the service provider 102 associated with the selected content item 225. The user access device 108 may send a request 216 to the associated service provider 102 and then load a landing page 218 from the service provider 102. The user may then perform a conversion action at the landing page 218, such as purchasing a product or service, registering, joining a mailing list, etc. A code snippet 220, which may be provided by the data processing system 106, may be included within a conversion confirmation page script, such as a script within a web page presented after the purchase. The user access device 108 may execute the code snippet 220, which may then contact the data processing system 106 and report conversion data 222 to the data processing system 106. The conversion data 222 may include conversion types and numbers as well as information from cookies. The conversion data 222 may be maintained in the conversion data repository 146.

FIG. 2A is an example only and not intended to be restrictive. Other data flows may therefore occur in the system 100 and, even with the data flow 200, the illustrated events and their particular order in time may vary. Further, the illustrated events may overlap and/or may exist in fewer steps. Moreover, certain events may not be present and additional and/or different events may be included.

In alternative data flows, the data processing system 106 can allow content providers to approve publishers in a manner similar to the manner in which publishers approve content providers. In such data flows, the data processing system 106 can receive publisher decisions (i.e., decisions about publishers) from one or more service providers 102. The publisher decisions made by content providers can include approvals and disapprovals of certain publishers. These approval/disapproval decisions can be based on aggregated scores, associated with publishers that are provided to content providers. The aggregated scores can represent ratings of publishers received from multiple service providers 102. When providing relevant content items to the user access devices 108, the data processing system 106 may take into account these publisher approvals/disapprovals. For example, the data processing system 106 may decide to not provide an otherwise relevant content item to a given publisher based on the content provider's disapproval of that publisher. Not providing a relevant content item to a publisher can include not bidding in an auction for publisher content item space.

In alternative data flows, the publisher 104 can send a content item request to the data processing system 106 prior to sending a content page to the user access device 108. The data processing system 106 may respond by sending relevant content items to the publisher 104. The publisher 104 may combine the received content items with requested publications in the publication page and then send the publication page, including the portion, to the user access device 108 for display to a user.

In alternative data flows, the data processing system 106 may selectively recommend and provide content items to the user access devices 108 based on search terms provided by the user access devices 108. In these dataflows, the data processing system 106 may provide searching services and receive search terms directly from the user access devices. The data processing system 106 can also receive search terms from a dedicated searching system that receives user search requests. The data processing system 106 may selectively recommend and provide content items to the user access devices based on the received search terms and content item keywords provided by the content providers. Other modifications to the data flow 200 are also possible.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 2B:
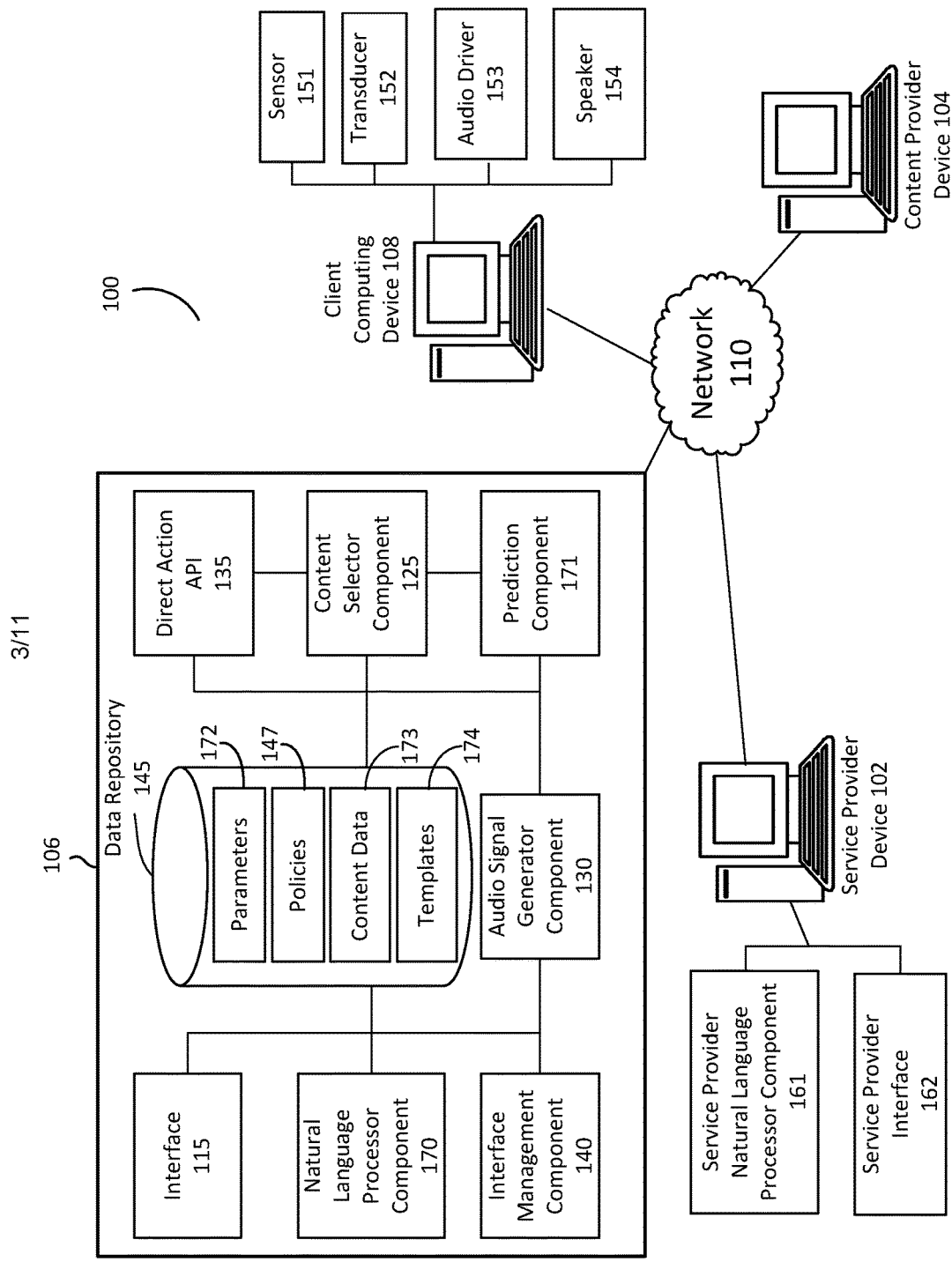
FIG. 2B depicts a system to of multi-modal transmission of packetized data in a voice activated computer network environment.

FIG. 2B depicts an example system 100 to for multi-modal transmission of packetized data in a voice activated data packet (or other protocol) based computer network environment. The system 100 can include at least one data processing system 106. The data processing system 106 can include at least one server having at least one processor. For example, the data processing system 106 can include a plurality of servers located in at least one data center or server farm. The data processing system 106 can determine, from an audio input signal a request and a trigger keyword associated with the request. Based on the request and trigger keyword the data processing system 106 can determine or select at least one action data structure, and can select at least one content item (and initiate other actions as described herein). The data processing system 106 can identify candidate interfaces for rendering of the action data structures or the content items, and can provide the action data structures or the content items for rendering by one or more candidate interfaces on one or more client computing devices based on resource utilization values for or of the candidate interfaces, for example as part of a voice activated communication or planning system. The action data structures (or the content items) can include one or more audio files that when rendered provide an audio output or acoustic wave. The action data structures or the content items can include other content (e.g., text, video, or image content) in addition to audio content.

The data processing system 106 can include multiple, logically-grouped servers and facilitate distributed computing techniques. The logical group of servers may be referred to as a data center, server farm or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The data processing system 106 can include servers in a data center that are stored in one or more high-density rack systems, along with associated storage systems, located for example in an enterprise data center. The data processing system 106 with consolidated servers in this way can improve system manageability, data security, the physical security of the system, and system performance by locating servers and high performance storage systems on localized high performance networks. Centralization of all or some of the data processing system 106 components, including servers and storage systems, and coupling them with advanced system management tools allows more efficient use of server resources, which saves power and processing requirements and reduces bandwidth usage.

The data processing system 106 can include at least one natural language processor (NLP) component 170, at least one interface 115, at least one prediction component 171, at least one content selector component 125, at least one audio signal generator component 130, at least one direct action application programming interface (API) 135, at least one interface management component 140, and at least one data repository 145. The NLP component 170, interface 115, prediction component 171, content selector component 125, audio signal generator component 130, direct action API 135, and interface management component 140 can each include at least one processing unit, server, virtual server, circuit, engine, agent, appliance, or other logic device such as programmable logic arrays configured to communicate with the data repository 145 and with other computing devices (e.g., at least one client computing device 108, at least one content provider computing device 104, or at least one service provider computing device 102) via the at least one computer network 110. The network 110 can include computer networks such as the internet, local, wide, metro or other area networks, intranets, satellite networks, other computer networks such as voice or data mobile phone communication networks, and combinations thereof.

The network 110 can include or constitute a display network, e.g., a subset of information resources available on the internet that are associated with a content placement or search engine results system, or that are eligible to include third party content items as part of a content item placement campaign. The network 110 can be used by the data processing system 106 to access information resources such as web pages, web sites, domain names, or uniform resource locators that can be presented, output, rendered, or displayed by the client computing device 108. For example, via the network 110 a user of the client computing device 108 can access information or data provided by the data processing system 106, the content provider computing device 104 or the service provider computing device 102.

The network 110 can include, for example a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network or a wireline network, and combinations thereof. The network 110 can include a wireless link, such as an infrared channel or satellite band. The topology of the network 110 may include a bus, star, or ring network topology. The network 110 can include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The client computing device 108, the content provider computing device 104, and the service provider computing device 102 can each include at least one logic device such as a computing device having a processor to communicate with each other or with the data processing system 106 via the network 110. The client computing device 108, the content provider computing device 104, and the service provider computing device 102 can each include at least one server, processor or memory, or a plurality of computation resources or servers located in at least one data center. The client computing device 108, the content provider computing device 104, and the service provider computing device 102 can each include at least one computing device such as a desktop computer, laptop, tablet, personal digital assistant, smartphone, portable computer, server, thin client computer, virtual server, or other computing device.

The client computing device 108 can include at least one sensor 151, at least one transducer 175, at least one audio driver 153, and at least one speaker 176. The sensor 151 can include a microphone or audio input sensor. The transducer 175 can convert the audio input into an electronic signal, or vice-versa. The audio driver 153 can include a script or program executed by one or more processors of the client computing device 108 to control the sensor 151, the transducer 175 or the audio driver 153, among other components of the client computing device 108 to process audio input or provide audio output. The speaker 176 can transmit the audio output signal.

The client computing device 108 can be associated with an end user that enters voice queries as audio input into the client computing device 108 (via the sensor 151) and receives audio output in the form of a computer generated voice that can be provided from the data processing system 106 (or the content provider computing device 104 or the service provider computing device 102) to the client computing device 108, output from the speaker 176. The audio output can correspond to an action data structure received from the direct action API 135, or a content item selected by the content selector component 125. The computer generated voice can include recordings from a real person or computer generated language.

The content provider computing device 104 (or the data processing system 106 or service provider computing device 102) can provide audio based content items or action data structures for display by the client computing device 108 as an audio output. The action data structure or content item can include an organic response or offer for a good or service, such as a voice based message that states: "Today it will be sunny and 80 degrees at the beach" as an organic response to a voice-input query of "Is today a beach day?". The data processing system 106 (or other system 100 component such as the content provider computing device 104 can also provide a content item as a response, such as a voice or text message based content item offering sunscreen.

The content provider computing device 104 or the data repository 145 can include memory to store a series of audio action data structures or content items that can be provided in response to a voice based query. The action data structures and content items can include packet based data structures for transmission via the network 110. The content provider computing device 104 can also provide audio or text based content items (or other content items) to the data processing system 106 where they can be stored in the data repository 145. The data processing system 106 can select the audio action data structures or text based content items and provide (or instruct the content provider computing device 104 to provide) them to the same or different client computing devices 108 responsive to a query received from one of those client computing device 108. The audio based action data structures can be exclusively audio or can be combined with text, image, or video data. The content items can be exclusively text or can be combined with audio, image or video data.

The service provider computing device 102 can include at least one service provider natural language processor (NLP) component 161 and at least one service provider interface 162. The service provider NLP component 161 (or other components such as a direct action API of the service provider computing device 102) can engage with the client computing device 108 (via the data processing system 106 or bypassing the data processing system 106) to create a back-and-forth real-time voice or audio based conversation (e.g., a session) between the client computing device 108 and the service provider computing device 102. For example, the service provider interface 162 can receive or provide data messages (e.g., action data structures or content items) to the direct action API 135 of the data processing system 106. The direct action API 135 can also generate the action data structures independent from or without input from the service provider computing device 102. The service provider computing device 102 and the content provider computing device 104 can be associated with the same entity. For example, the content provider computing device 104 can create, store, or make available content items for beach relates services, such as sunscreen, beach towels or bathing suits, and the service provider computing device 102 can establish a session with the client computing device 108 to respond to a voice input query about the weather at the beach, directions for a beach, or a recommendation for an area beach, and can provide these content items to the end user of the client computing device 108 via an interface of the same client computing device 108 from which the query was received, a different interface of the same client computing device 108, or an interface of a different client computing device. The data processing system 106, via the direct action API 135, the NLP component 170 or other components can also establish the session with the client computing device, including or bypassing the service provider computing device 102, to for example to provide an organic response to a query related to the beach.

The data repository 145 can include one or more local or distributed databases, and can include a database management system. The data repository 145 can include computer data storage or memory and can store one or more parameters 172, one or more policies 147, content data 173, or templates 174 among other data. The parameters 172, policies 147, and templates 174 can include information such as rules about a voice based session between the client computing device 108 and the data processing system 106 (or the service provider computing device 102). The content data 173 can include content items for audio output or associated metadata, as well as input audio messages that can be part of one or more communication sessions with the client computing device 108.

The system 100 can optimize processing of action data structures and content items in a voice activated data packet (or other protocol) environment. For example, the data processing system 106 can include or be part of a voice activated assistant service, voice command device, intelligent personal assistant, knowledge navigator, event planning, or other assistant program. The data processing system 106 can provide one or more instances of action data structures as audio output for display from the client computing device 108 to accomplish tasks related to an input audio signal. For example, the data processing system can communicate with the service provider computing device 102 or other third party computing devices to generate action data structures with information about a beach, among other things. For example, an end user can enter an input audio signal into the client computing device 108 of: "OK, I would like to go to the beach this weekend" and an action data structure can indicate the weekend weather forecast for area beaches, such as "it will be sunny and 80 degrees at the beach on Saturday, with high tide at 3 pm."

The action data structures can include a number of organic or non-sponsored responses to the input audio signal. For example, the action data structures can include a beach weather forecast or directions to a beach. The action data structures in this example include organic or non-sponsored content that is directly responsive to the input audio signal. The content items responsive to the input audio signal can include sponsored or non-organic content, such as an offer to buy sunscreen from a convenience store located near the beach. In this example, the organic action data structure (beach forecast) is responsive to the input audio signal (a query related to the beach), and the content item (a reminder or offer for sunscreen) is also responsive to the same input audio signal. The data processing system 106 can evaluate system 100 parameters (e.g., power usage, available displays, formats of displays, memory requirements, bandwidth usage, power capacity or time of input power (e.g., internal battery or external power source such as a power source from a wall output) to provide the action data structure and the content item to different candidate interfaces on the same client computing device 108, or to different candidate interfaces on different client computing devices 108.

The data processing system 106 can include an application, script or program installed at the client computing device 108, such as an app to communicate input audio signals (e.g., as data packets via a packetized or other protocol based transmission) to at least one interface 115 of the data processing system 106 and to drive components of the client computing device 108 to render output audio signals (e.g., for action data structures) or other output signals (e.g., content items). The data processing system 106 can receive data packets or other signal that includes or identifies an audio input signal. For example, the data processing system 106 can execute or run the NLP component 170 to receive the audio input signal.

The NLP component 170 can convert the audio input signal into recognized text by comparing the input signal against a stored, representative set of audio waveforms (e.g., in the data repository 145) and choosing the closest matches. The representative waveforms are generated across a large set of users, and can be augmented with speech samples. After the audio signal is converted into recognized text, the NLP component 170 can match the text to words that are associated, for example via training across users or through manual specification, with actions that the data processing system 106 can serve.

The audio input signal can be detected by the sensor 151 (e.g., a microphone) of the client computing device. Via the transducer 175, the audio driver 153, or other components the client computing device 108 can provide the audio input signal to the data processing system 106 (e.g., via the network 110) where it can be received (e.g., by the interface 115) and provided to the NLP component 170 or stored in the data repository 145 as content data 173.

The NLP component 170 can receive or otherwise obtain the input audio signal. From the input audio signal, the NLP component 170 can identify at least one request or at least one trigger keyword corresponding to the request. The request can indicate intent or subject matter of the input audio signal. The trigger keyword can indicate a type of action likely to be taken. For example, the NLP component 170 can parse the input audio signal to identify at least one request to go to the beach for the weekend. The trigger keyword can include at least one word, phrase, root or partial word, or derivative indicating an action to be taken. For example, the trigger keyword "go" or "to go to" from the input audio signal can indicate a need for transport or a trip away from home. In this example, the input audio signal (or the identified request) does not directly express an intent for transport, however the trigger keyword indicates that transport is an ancillary action to at least one other action that is indicated by the request.

The prediction component 171 (or other mechanism of the data processing system 106) can generate, based on the request or the trigger keyword, at least one action data structure associated with the input audio signal. The action data structure can indicate information related to subject matter of the input audio signal. The action data structure can include one or more than one action, such as organic responses to the input audio signal. For example, the input audio signal "OK, I would like to go to the beach this weekend" can include at least one request indicating an interest for a beach weather forecast, surf report, or water temperature information, and at least one trigger keyword, e.g., "go" indicating travel to the beach, such as a need for items one may want to bring to the beach, or a need for transportation to the beach. The prediction component 171 can generate or identify subject matter for at least one action data structure, an indication of a request for a beach weather forecast, as well as subject matter for a content item, such as an indication of a query for sponsored content related to spending a day at a beach. From the request or the trigger keyword the prediction component 171 (or other system 100 component such as the NLP component 170 or the direct action API 135) predicts, estimates, or otherwise determines subject matter for action data structures or for content items. From this subject matter, the direct action API 135 can generate at least one action data structure and can communicate with at least one content provider computing device 104 to obtain at least one content item 155. The prediction component 171 can access the parameters 172 or policies 147 in the data repository 145 to determine or otherwise estimate requests for action data structures or content items. For example, the parameters 172 or policies 147 could indicate requests for a beach weekend weather forecast action or for content items related to beach visits, such as a content item for sunscreen.

The content selector component 125 can obtain indications of any of the interest in or request for the action data structure or for the content item. For example, the prediction component 171 can directly or indirectly (e.g., via the data repository 145) provide an indication of the action data structure or content item to the content selector component 125. The content selector component 125 can obtain this information from the data repository 145, where it can be stored as part of the content data 173. The indication of the action data structure can inform the content selector component 125 of a need for area beach information, such as a weather forecast or products or services the end user may need for a trip to the beach.

From the information received by the content selector component 125, e.g., an indication of a forthcoming trip to the beach, the content selector component 125 can identify at least one content item. The content item can be responsive or related to the subject matter of the input audio query. For example, the content item can include data message identifying a store near the beach that has sunscreen, or offering a taxi ride to the beach. The content selector component 125 can query the data repository 145 to select or otherwise identify the content item, e.g., from the content data 173. The content selector component 125 can also select the content item from the content provider computing device 104. For example responsive to a query received from the data processing system 106, the content provider computing device 104 can provide a content item to the data processing system 106 (or component thereof) for eventual output by the client computing device 108 that originated the input audio signal, or for output to the same end user by a different client computing device 108.

In some implementations, the content selector component 125 can select or identify a primary search result and a secondary search result. Based on the primary search result, the content selector component 125 can select a digital component or content item the data repository 145. The content selector component 125 can also identify a secondary search result that is related to the primary search result. The secondary search results can have a secondary search URL. The content selector component 125 can select canonicalized digital components that are related to the secondary search URL. The digital components can also be received from the creatives database. The digital components, primary search results, canonicalized digital components and the secondary search results can be included in the action data structure. The digital components can be associated with a secondary search result URL. The identified canonicalized URL can be associated with the primary content item or digital component selected by the content selector component 125.

The audio signal generator component 130 can generate or otherwise obtain an output signal that includes the content item (as well as the action data structure) responsive to the input audio signal. For example, the data processing system 106 can execute the audio signal generator component 130 to generate or create an output signal corresponding to the action data structure or to the content item. The interface component 115 of the data processing system 106 can provide or transmit one or more data packets that include the output signal via the computer network 110 to any client computing device 108. The interface 115 can be designed, configured, constructed, or operational to receive and transmit information using, for example, data packets. The interface 115 can receive and transmit information using one or more protocols, such as a network protocol. The interface 115 can include a hardware interface, software interface, wired interface, or wireless interface. The interface 115 can facilitate translating or formatting data from one format to another format. For example, the interface 115 can include an application programming interface that includes definitions for communicating between various components, such as software components of the system 100.

The data processing system 106 can provide the output signal including the action data structure from the data repository 145 or from the audio signal generator component 130 to the client computing device 108. The data processing system 106 can provide the output signal including the content item from the data repository 145 or from the audio signal generator component 130 to the same or to a different client computing device 108.

The data processing system 106 can also instruct, via data packet transmissions, the content provider computing device 104 or the service provider computing device 102 to provide the output signal (e.g., corresponding to the action data structure or to the content item) to the client computing device 108. The output signal can be obtained, generated, transformed to or transmitted as one or more data packets (or other communications protocol) from the data processing system 106 (or other computing device) to the client computing device 108.

The content selector component 125 can select the content item or the action data structure for the as part of a real-time content selection process. For example, the action data structure can be provided to the client computing device 108 for transmission as audio output by an interface of the client computing device 108 in a conversational manner in direct response to the input audio signal. The real-time content selection process to identify the action data structure and provide the content item to the client computing device 108 can occur within one minute or less from the time of the input audio signal and be considered real-time. The data processing system 106 can also identify and provide the content item to at least one interface of the client computing device 108 that originated the input audio signal, or to a different client computing device 108.

The action data structure (or the content item), for example obtained or generated by the audio signal generator component 130 transmitted via the interface 115 and the computer network 110 to the client computing device 108, can cause the client computing device 108 to execute the audio driver 153 to drive the speaker 176 to generate an acoustic wave corresponding to the action data structure or to the content item. The acoustic wave can include words of or corresponding to the action data structure or content item.

The acoustic wave representing the action data structure can be output from the client computing device 108 separately from the content item. For example, the acoustic wave can include the audio output of "Today it will be sunny and 80 degrees at the beach." In this example, the data processing system 106 obtains the input audio signal of, for example, "OK, I would like to go to the beach this weekend." From this information the NLP component 170 identifies at least one request or at least one trigger keyword, and the prediction component 171 uses the request(s) or trigger keyword(s) to identify a request for an action data structure or for a content item. The content selector component 125 (or other component) can identify, select, or generate a content item for, e.g., sunscreen available near the beach. The direct action API 135 (or other component) can identify, select, or generate an action data structure for, e.g., the weekend beach forecast. The data processing system 106 or component thereof such as the audio signal generator component 130 can provide the action data structure for output by an interface of the client computing device 108. For example, the acoustic wave corresponding to the action data structure can be output from the client computing device 108. The data processing system 106 can provide the content item for output by a different interface of the same client computing device 108 or by an interface of a different client computing device 108.

The packet based data transmission of the action data structure by data processing system 106 to the client computing device 108 can include a direct or real-time response to the input audio signal of "OK, I would like to go to the beach this weekend" so that the packet based data transmissions via the computer network 110 that are part of a communication session between the data processing system 106 and the client computing device 108 with the flow and feel of a real-time person to person conversation. This packet based data transmission communication session can also include the content provider computing device 104 or the service provider computing device 102.

The content selector component 125 can select the content item or action data structure based on at least one request or at least one trigger keyword of the input audio signal. For example, the requests of the input audio signal "OK, I would like to go to the beach this weekend" can indicate subject matter of the beach, travel to the beach, or items to facilitate a trip to the beach. The NLP component 170 or the prediction component 171 (or other data processing system 106 components executing as part of the direct action API 135) can identify the trigger keyword "go" "go to" or "to go to" and can determine a transportation request to the beach based at least in part on the trigger keyword. The NLP component 170 (or other system 100 component) can also determine a solicitation for content items related to beach activity, such as for sunscreen or beach umbrellas. Thus, the data processing system 106 can infer actions from the input audio signal that are secondary requests (e.g., a request for sunscreen) that are not the primary request or subject of the input audio signal (information about the beach this weekend).

The action data structures and content items can correspond to subject matter of the input audio signal. The direct action API 135 can execute programs or scripts, for example from the NLP component 170, the prediction component 171, or the content selector component 125 to identify action data structures or content items for one or more of these actions. The direct action API 135 can execute a specified action to satisfy the end user's intention, as determined by the data processing system 106. Depending on the action specified in its inputs, the direct action API 135 can execute code or a dialog script that identifies the parameters required to fulfil a user request. Such code can lookup additional information, e.g., in the data repository 145, such as the name of a home automation service, or it can provide audio output for rendering at the client computing device 108 to ask the end user questions such as the intended destination of a requested taxi. The direct action API 135 can determine necessary parameters and can package the information into an action data structure, which can then be sent to another component such as the content selector component 125 or to the service provider computing device 102 to be fulfilled.

The direct action API 135 of the data processing system 106 can generate, based on the request or the trigger keyword, the action data structures. The action data structures can be generated responsive to the subject matter of the input audio signal. The action data structures can be included in the messages that are transmitted to or received by the service provider computing device 102. Based on the audio input signal parsed by the NLP component 170, the direct action API 135 can determine to which, if any, of a plurality of service provider computing devices 102 the message should be sent. For example, if an input audio signal includes "OK, I would like to go to the beach this weekend," the NLP component 170 can parse the input audio signal to identify requests or trigger keywords such as the trigger keyword word "to go to" as an indication of a need for a taxi. The direct action API 135 can package the request into an action data structure for transmission as a message to a service provider computing device 102 of a taxi service. The message can also be passed to the content selector component 125. The action data structure can include information for completing the request. In this example, the information can include a pick up location (e.g., home) and a destination location (e.g., a beach). The direct action API 135 can retrieve a template 174 from the data repository 145 to determine which fields to include in the action data structure. The direct action API 135 can retrieve content from the data repository 145 to obtain information for the fields of the data structure. The direct action API 135 can populate the fields from the template with that information to generate the data structure. The direct action API 135 can also populate the fields with data from the input audio signal. The templates 174 can be standardized for categories of service providers or can be standardized for specific service providers. For example, ride sharing service providers can use the following standardized template 174 to create the data structure: {client$_{deviceidentifier}$; authentication$_{credentials}$; pick$_{uplocation}$; destination$_{location}$; no$_{passengers}$; service$_{level}$}.

The content selector component 125 can identify, select, or obtain multiple content items resulting from a multiple content selection processes. The content selection processes can be real-time, e.g., part of the same conversation, communication session, or series of communications sessions between the data processing system 106 and the client computing device 108 that involve common subject matter. The conversation can include asynchronous communications separated from one another by a period of hours or days, for example. The conversation or communication session can last for a time period from receipt of the first input audio signal until an estimated or known conclusion of a final action related to the first input audio signal, or receipt by the data processing system 106 of an indication of a termination or expiration of the conversation. For example, the data processing system 106 can determine that a conversation related to a weekend beach trip begins at the time or receipt of the input audio signal and expires or terminates at the end of the weekend, e.g., Sunday night or Monday morning. The data processing system 106 that provides action data structures or content items for rendering by one or more interfaces of the client computing device 108 or of another client computing device 108 during the active time period of the conversation (e.g., from receipt of the input audio signal until a determined expiration time) can be considered to be operating in real-time. In this example the content selection processes and rendering of the content items and action data structures occurs in real time.

The interface management component 140 can poll, determine, identify, or select interfaces for rendering of the action data structures and of the content items related to the input audio signal. For example, the interface management component 140 can identify one or more candidate interfaces of client computing devices 108 associated with an end user that entered the input audio signal (e.g., "What is the weather at the beach today?") into one of the client computing devices 108 via an audio interface. The interfaces can include hardware such as sensor 151 (e.g., a microphone), speaker 176, or a screen size of a computing device, alone or combined with scripts or programs (e.g., the audio driver 153) as well as apps, computer programs, online documents (e.g., webpage) interfaces and combinations thereof.

The interfaces can include social media accounts, text message applications, or email accounts associated with an end user of the client computing device 108 that originated the input audio signal. Interfaces can include the audio output of a smartphone, or an app based messaging device installed on the smartphone, or on a wearable computing device, among other client computing devices 108. The interfaces can also include display screen parameters (e.g., size, resolution), audio parameters, mobile device parameters, (e.g., processing power, battery life, existence of installed apps or programs, or sensor 151 or speaker 176 capabilities), content slots on online documents for text, image, or video renderings of content items, chat applications, laptops parameters, smartwatch or other wearable device parameters (e.g., indications of their display or processing capabilities), or virtual reality headset parameters.

The interface management component 140 can poll a plurality of interfaces to identify candidate interfaces. Candidate interfaces include interfaces having the capability to render a response to the input audio signal, (e.g., the action data structure as an audio output, or the content item that can be output in various formats including non-audio formats). The interface management component 140 can determine parameters or other capabilities of interfaces to determine that they are (or are not) candidate interfaces. For example, the interface management component 140 can determine, based on parameters 172 of the content item or of a first client computing device 108 (e.g., a smartwatch wearable device), that the smartwatch includes an available visual interface of sufficient size or resolution to render the content item. The interface management component 140 can also determine that the client computing device 108 that originated the input audio signal has a speaker 176 hardware and installed program e.g., an audio driver or other script to render the action data structure.

The interface management component 140 can determine utilization values for candidate interfaces. The utilization values can indicate that a candidate interface can (or cannot) render the action data structures or the content items provided in response to input audio signals. The utilization values can include parameters 172 obtained from the data repository 145 or other parameters obtained from the client computing device 108, such as bandwidth or processing utilizations or requirements, processing power, power requirements, battery status, memory utilization or capabilities, or other interface parameters that indicate the available of an interface to render action data structures or content items. The battery status can indicate a type of power source (e.g., internal battery or external power source such as via an output), a charging status (e.g., currently charging or not), or an amount of remaining battery power. The interface management component 140 can select interfaces based on the battery status or charging status.

The interface management component 140 can order the candidate interfaces in a hierarchy or ranking based on the utilization values. For example different utilization values (e.g., processing requirements, display screen size, accessibility to the end user) can be given different weights. The interface management component 140 can rank one or more of the utilization values of the candidate interfaces based on their weights to determine an optimal corresponding candidate interface for rendering of the content item (or action data structure). Based on this hierarchy, the interface management component 140 can select the highest ranked interface for rendering of the content item.

Based on utilization values for candidate interfaces, the interface management component 140 can select at least one candidate interface as a selected interface for the content item. The selected interface for the content item can be the same interface from which the input audio signal was received (e.g., an audio interface of the client computing device 108) or a different interface (e.g., a text message based app of the same client computing device 108, or an email account accessible from the same client computing device 108.

The interface management component 140 can select an interface for the content item that is an interface of a different client computing device 108 than the device that originated the input audio signal. For example, the data processing system 106 can receive the input audio signal from a first client computing device 108 (e.g., a smartphone), and can select an interface such as a display of a smartwatch (or any other client computing device for rendering of the content item. The multiple client computing devices 108 can all be associated with the same end user. The data processing system 106 can determine that multiple client computing devices 108 are associated with the same end user based on information received with consent from the end user such as user access to a common social media or email account across multiple client computing devices 108.

The interface management component 140 can also determine that an interface is unavailable. For example the interface management component 140 can poll interfaces and determine that a battery status of a client computing device 108 associated with the interface is low, or below a threshold level such as 10%. Or the interface management component 140 can determine that the client computing device 108 associated with the interface lacks sufficient display screen size or processing power to render the content item, or that the processor utilization rate is too high, as the client computing device is currently executing another application, for example to stream content via the network 110. In these and other examples the interface management component 140 can determine that the interface is unavailable and can eliminate the interface as a candidate for rendering the content item or the action data structure.

Thus, the interface management component 140 can determine that a candidate interface accessible by the first client computing device 108 is linked to an account of an end user, and that a second candidate interface accessible by a second client computing device 108 is also linked to the same account. For example, both client computing devices 108 may have access to the same social media account, e.g., via installation of an app or script at each client computing device 108. The interface management component 140 can also determine that multiple interfaces correspond to the same account, and can provide multiple, different content items to the multiple interfaces corresponding to the common account. For example, the data processing system 106 can determine, with end user consent, that an end user has accessed an account from different client computing devices 108. These multiple interfaces can be separate instances of the same interface (e.g., the same app installed on different client computing devices 108) or different interfaces such as different apps for different social media accounts that are both linked to a common email address account, accessible from multiple client computing devices 108.

The interface management component 140 can also determine or estimate distances between client computing devices 108 associated with candidate interfaces. For example, the data processing system 106 can obtain, with user consent, an indication that the input audio signal originated from a smartphone or virtual reality headset computing device 108, and that the end user is associated with an active smartwatch client computing device 108. From this information the interface management component can determine that the smartwatch is active, e.g., being worn by the end user when the end user enters the input audio signal into the smartphone, so that the two client computing devices 108 are within a threshold distance of one another. In another example, the data processing system 106 can determine, with end user consent, the location of a smartphone that is the source of an input audio signal, and can also determine that a laptop account associated with the end user is currently active. For example, the laptop can be signed into a social media account indicating that the user is currently active on the laptop. In this example the data processing system 106 can determine that the end user is within a threshold distance of the smartphone and of the laptop, so that the laptop can be an appropriate choice for rendering of the content item via a candidate interface.

The interface management component 140 can select the interface for the content item based on at least one utilization value indicating that the selected interface is the most efficient for the content item. For example, from among candidate interfaces, the interface to render the content item at the smartwatch uses the least bandwidth due as the content item is smaller and can be transmitted with fewer resources. Or the interface management component 140 can determine that the candidate interface selected for rendering of the content item is currently charging (e.g., plugged in) so that rendering of the content item by the interface will not drain battery power of the corresponding client computing device 108. In another example, the interface management component 140 can select a candidate interface that is currently performing fewer processing operations than another, unselected interface of for example a different client computing device 108 that is currently streaming video content from the network 110 and therefore less available to render the content item without delay.

The interface management component 140 (or other data processing system 106 component) can convert the content item for delivery in a modality compatible with the candidate interface. For example, if the candidate interface is a display of a smartwatch, smartphone, or tablet computing device, the interface management component 140 can size the content item for appropriate visual display given the dimensions of the display screen associated with the interface. The interface management component 140 can also convert the content item to a packet or other protocol based format, including proprietary or industry standard format for transmission to the client computing device 108 associated with the selected interface. The interface selected by the interface management component 140 for the content item can include an interface accessible from multiple client computing devices 108 by the end user. For example, the interface can be or include a social media account that the end user can access via the client computing device 108 that originated the input audio signal (e.g., a smartphone) as well as other client computing devices such as tabled or desktop computers or other mobile computing devices.

The interface management component 140 can also select at least one candidate interface for the action data structure. This interface can be the same interface from which the input audio signal was obtained, e.g., a voice activated assistant service executed at a client computing device 108. This can be the same interface or a different interface than the interface management component 140 selects for the content item. The interface management component 140 (or other data processing system 106 components) can provide the action data structure to the same client computing device 108 that originated the input audio signal for rendering as audio output as part of the assistant service. The interface management component 140 can also transmit or otherwise provide the content item to the selected interface for the content item, in any converted modality appropriate for rendering by the selected interface.

Thus, the interface management component 140 can provide the action data structure as audio output for rendering by an interface of the client computing device 108 responsive to the input audio signal received by the same client computing device 108. The interface management component 140 can also provide the content item for rendering by a different interface of the same client computing device 108 or of a different client computing device 108 associated with the same end user. For example, the action data structure, e.g., "it will be sunny and 80 degrees at the beach on Saturday" can be provided for audio rendering by the client computing device as part of an assistant program interface executing in part at the client computing device 108, and the content item e.g., a text, audio, or combination content item indicating that "sunscreen is available from the convenience store near the beach" can be provided for rendering by an interface of the same or a different computing device 108, such as an email or text message accessible by the same or a different client computing device 108 associated with the end user.

Separating the content item from the action data structure and sending the content item as, for example, a text message rather than an audio message can result in reduced processing power for the client computing device 108 that accesses the content item since, for example, text message data transmissions are less computationally intensive than audio message data transmissions. This separation can also reduce power usage, memory storage, or transmission bandwidth used to render the content item. This results in increased processing, power, and bandwidth efficiencies of the system 100 and devices such as the client computing devices 108 and the data processing system 106. This increases the efficiency of the computing devices that process these transactions, and increases the speed with which the content items can be rendered. The data processing system 106 can process thousands, tens of thousands or more input audio signals simultaneously so the bandwidth, power, and processing savings can be significant and not merely incremental or incidental.

The interface management component 140 can provide or deliver the content item to the same client computing device 108 (or a different device) as the action data structure subsequent to delivery of the action data structure to the client computing device 108. For example, the content item can be provided for rendering via the selected interface upon conclusion of audio output rendering of the action data structure. The interface management component 140 can also provide the content item to the selected interface concurrent with the provision of the action data structure to the client computing device 108. The interface management component 140 can provide the content item for delivery via the selected interface within a pre-determined time period from receipt of the input audio signal by the NLP component 170. The time period, for example, can be any time during an active length of the conversation of session. For example, if the input audio signal is "I would like to go to the beach this weekend" the pre-determined time period can be any time from receipt of the input audio signal through the end of the weekend, e.g., the active period of the conversation. The pre-determined time period can also be a time triggered from rendering of the action data structure as audio output by the client computing device 108, such as within 5 minutes, one hour or one day of this rendering.

The interface management component 140 can provide the action data structure to the client computing device 108 with an indication of the existence of the content item. For example, the data processing system 106 can provide the action data structure that renders at the client computing device 108 to provide the audio output "it will be sunny and 80 degrees at the beach on Saturday, check your email for more information." The phrase "check your email for more information" can indicate the existence of a content item, e.g., for sunscreen, provided by the data processing system 106 to an interface (e.g., email). In this example, sponsored content can be provided as content items to the email (or other) interface and organic content such as the weather can be provided as the action data structure for audio output.

The data processing system 106 can also provide the action data structure with a prompt that queries the user to determine user interest in obtaining the content item. For example, the action data structure can indicate "it will be sunny and 80 degrees at the beach on Saturday, would you like to hear about some services to assist with your trip?" The data processing system 106 can receive another audio input signal from the client computing device 108 in response to the prompt "would you like to hear about some services to assist with your trip?" such as "sure". The NLP component 170 can parse this response, e.g., "sure" and interpret it as authorization for audio rendering of the content item by the client computing device 108. In response, the data processing system 106 can provide the content item for audio rendering by the same client computing device 108 from which the response "sure" originated.

The data processing system 106 can delay transmission of the content item associated with the action data structure to optimize processing utilization. For example, the data processing system 106 provide the action data structure for rendering as audio output by the client computing device in real-time responsive to receipt of the input audio signal, e.g., in a conversational manner, and can delay content item transmission until an off-peak or non-peak period of data center usage, which results in more efficient utilization of the data center by reducing peak bandwidth usage, heat output or cooling requirements. The data processing system 106 can also initiate a conversion or other activity associated with the content item, such as ordering a car service responsive to a response to the action data structure or to the content item, based on data center utilization rates or bandwidth metrics or requirements of the network 110 or of a data center that includes the data processing system 106.

Based on a response to a content item or to the action data structure for a subsequent action, such as a click on the content item rendered via the selected interface, the data processing system 106 can identify a conversion, or initiate a conversion or action. Processors of the data processing system 106 can invoke the direct action API 135 to execute scripts that facilitate the conversion action, such as to order a car from a car share service to take the end user to or from the beach. The direct action API 135 can obtain content data 173 (or parameters 172 or policies 147) from the data repository 145, as well as data received with end user consent from the client computing device 108 to determine location, time, user accounts, logistical or other information in order to reserve a car from the car share service. Using the direct action API 135, the data processing system 106 can also communicate with the service provider computing device 102 to complete the conversion by in this example making the car share pick up reservation.

Figure 2C:
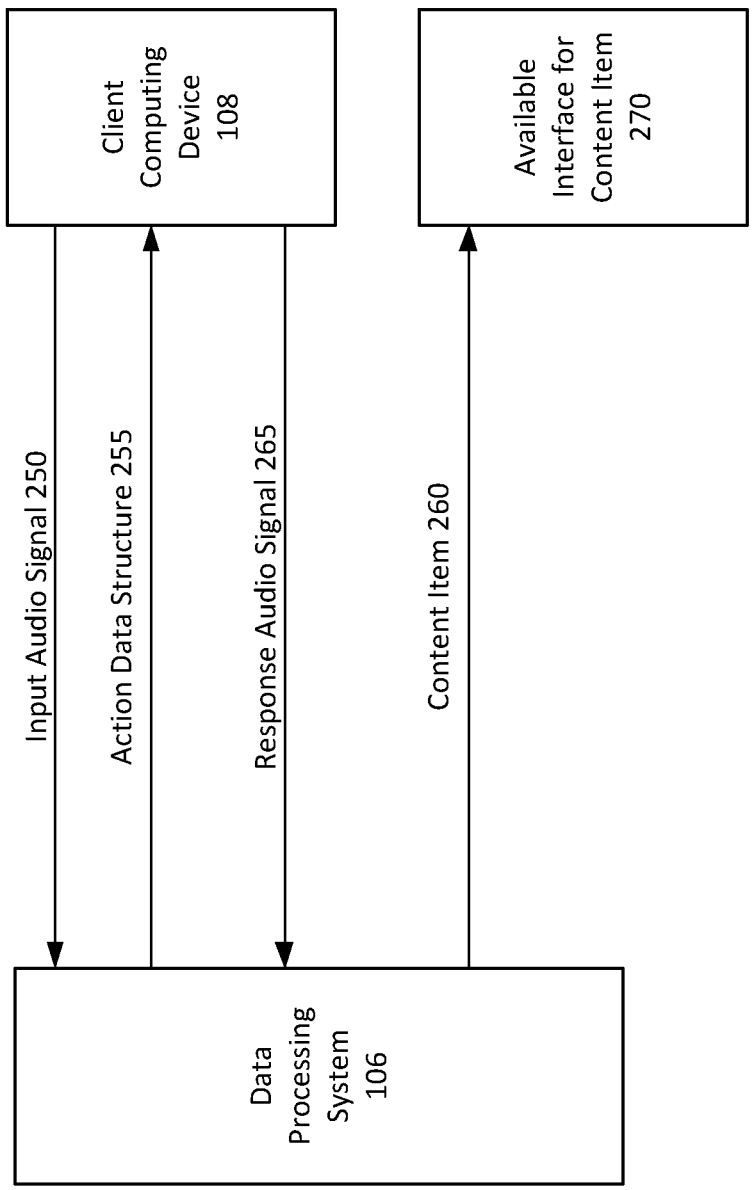
FIG. 2C depicts a flow diagram for multi-modal transmission of packetized data in a voice activated computer network environment.

FIG. 2C depicts another example flow diagram 200 for multi-modal transmission of packetized data in a voice activated computer network environment. The data processing system 106 can receive the input audio signal 250, e.g., "OK, I would like to go to the beach this weekend." In response, the data processing system generates at least one action data structure 255 and at least one content item 215. The action data structure 255 can include organic or non-sponsored content, such as a response for audio rendering stating "It will be sunny and 80 degrees at the beach this weekend" or "high tide is at 3 pm." The data processing system 106 can provide the action data structure 255 to the same client computing device 108 that originated the input audio signal 250, for rendering by a candidate interface of the client computing device 108, e.g., as output in a real time or conversational manner as part of a digital or conversational assistant platform.

The data processing system 106 can select the candidate interface 270 as a selected interface for the content item 215, and can provide the content item 215 to the selected interface 270. The content item 215 can also include a data structure, converted to the appropriate modality by the data processing system 106 for rendering by the selected interface 270. The content item 215 can include sponsored content, such as an offer to rent a beach chair for the day, or for sunscreen. The selected interface 270 can be part of or executed by the same client computing device 108 or by a different device accessible by the end user of the client computing device 108. Transmission of the action data structure 255 and the content item 215 can occur at the same time or subsequent to one another. The action data structure 255 can include an indicator that the content item 215 is being or will be transmitted separately via a different modality or format to the selected interface, alerting the end user to the existence of the content item 215.

The action data structure 255 and the content item 215 can be provided separately for rendering to the end user. By separating the sponsored content (content item 215) from the organic response (action data structure 255) audio or other alerts indicating that the content item 215 is sponsored do not need to be provided with the action data structure 255. This can reduce bandwidth requirements associated with transmission of the action data structure 255 via the network 110 and can simplify rendering of the action data structure 255, for example without audio disclaimer or warning messages.

The data processing system 106 can receive a response audio signal 265. The response audio signal 265 can include an audio signal such as, "great, please book me a hotel on the beach this weekend." Receipt by the data processing system 106 of the response audio signal 265 can cause the data processing system to invoke the direct action API 135 to execute a conversion to, for example, book a hotel room on the beach. The direct action API 135 can also communicate with at least one service provider computing device 102 to provide information to the service provider computing device 102 so that the service provider computing device 102 can complete or confirm the booking process.

Figure 3A:
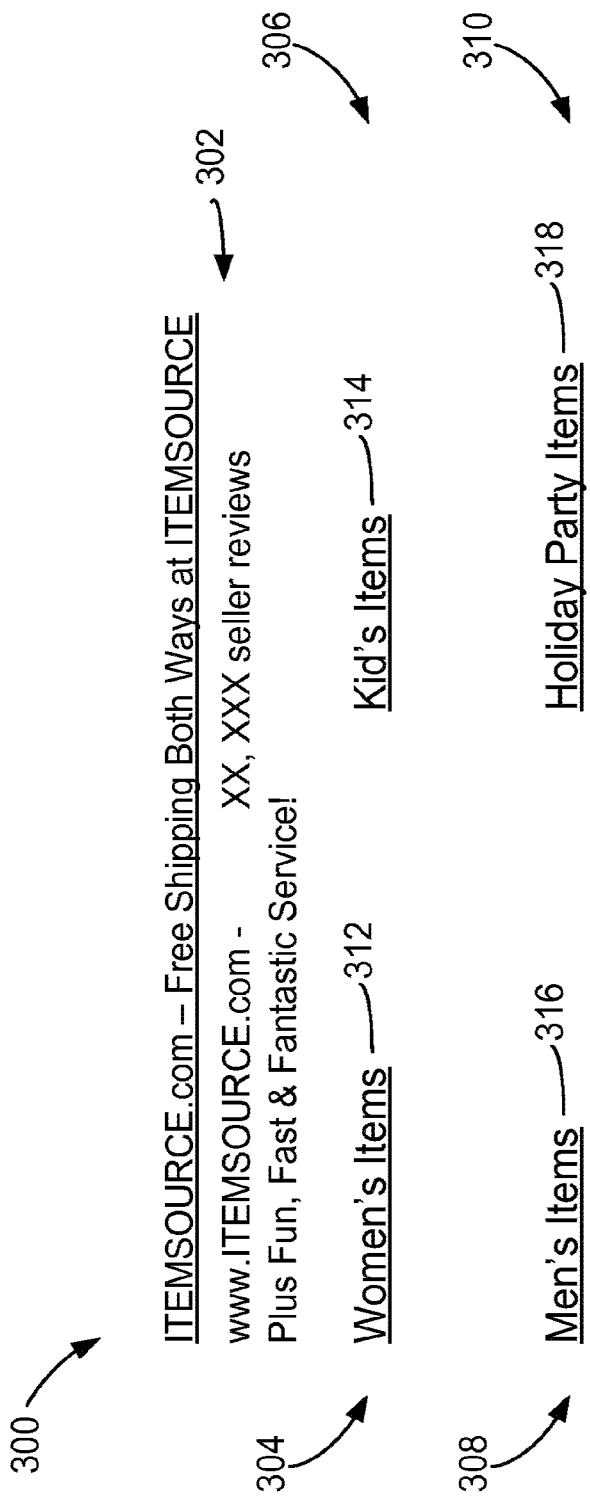
FIG. 3A is a sample screenshot showing representative search results arising from a search specified by a user.

FIG. 3A is a sample screenshot 300 showing representative search results arising from a search for "items" specified by a user 107. As described above, when a user 107 (shown in FIG. 1) performs an online search, an content delivery system (such as data processing system 106, also shown in FIG. 1) associated with the search provider will provide additional content in the form of one or more content items, to be presented to the user. For example, a search specified by user 107 may yield a primary result 302, which is a link to a content provider-specified landing page. To supplement primary result 302, service provider 102 and/or data processing system 106 provides several additional or secondary results 304-310. Each additional or secondary result displays a sitelink specified by a service provider 102 to appear in response to a specific user search inquiry. For example, result 304 includes sitelink 312, result 306 includes sitelink 314, result 308 includes sitelink 316, and result 310 includes sitelink 318. However, the texts appearing in sitelinks 312-318 alone may not contain sufficient information to enable a user to reach a decision whether to click on any of sitelinks 312-318.

Figure 3B:
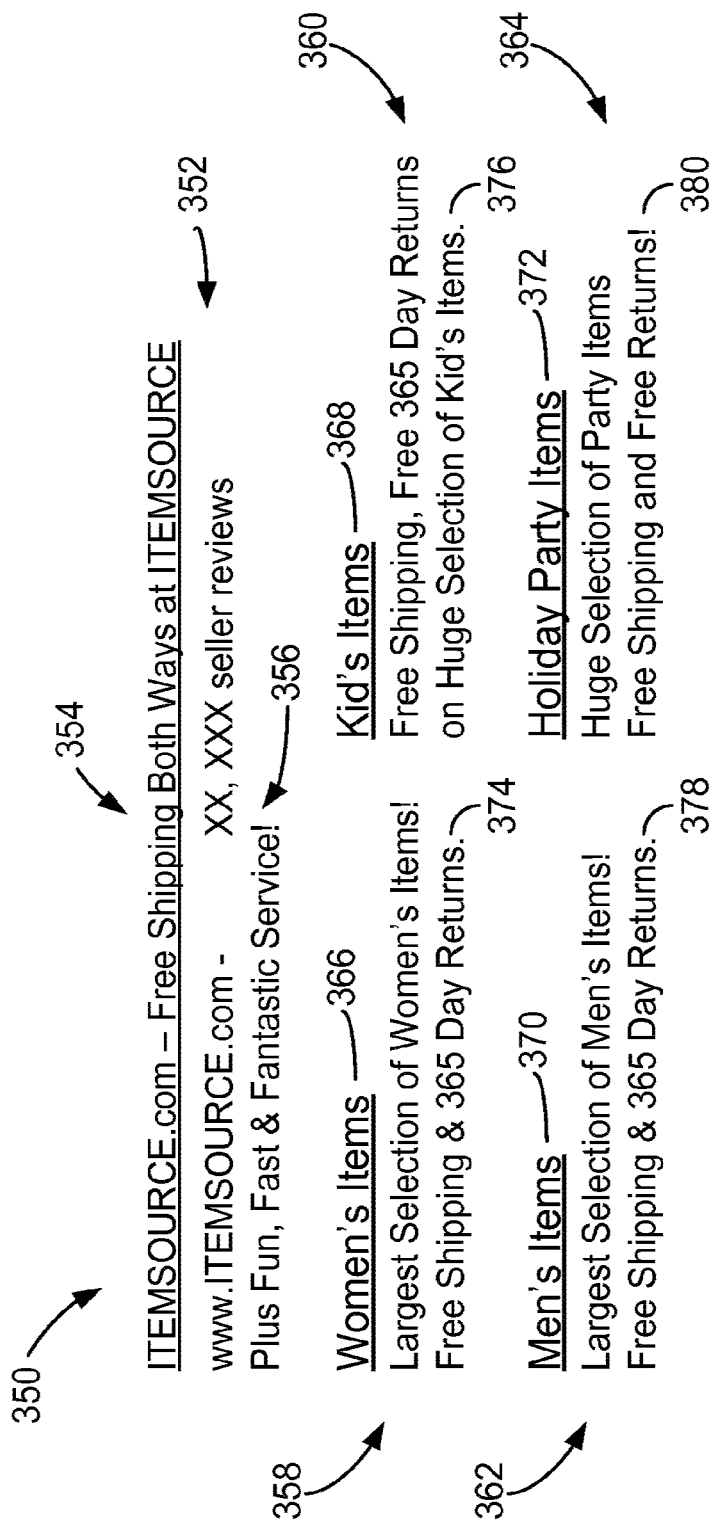
FIG. 3B is an example screenshot showing representative search results arising from a search specified by a user, in accordance with one embodiment of the present disclosure, in which additional or secondary sitelinks with associated creative texts are provided.

FIG. 3B is an example screenshot 350 according to the present disclosure, showing representative search results arising from a search for "items" specified by a user 107. A search specified by user 107 yields a primary result 352, which is a link to a content provider-specified landing page. Primary result 352 includes a link 354, as well as a descriptive creative 356. In addition to primary result 352, the search may also yield several additional or secondary results 358-364 including sitelinks 366-372. Appearing with sitelinks 366-372 are descriptive texts (referred to as "creatives" or "creative texts"). For example, additional or secondary result 358 includes sitelink 366 and creative 374, result 360 includes sitelink 368 and creative 376, result 362 includes sitelink 370 and creative 378, and result 364 includes sitelink 372 and creative 380. Data processing system 106 attempts to provide the most relevant content items to user 107. A service provider 102 may have a plurality of landing pages, with associated URLs (forming additional or secondary results 358-364, for example), that are relevant to the search ordered by user 107. Each landing page (and associated URL) has one or more creative texts associated with it. These creative texts may also be associated with other landing pages (and URLs) within the content provider website. Accordingly, data processing system 106, in an example embodiment of the present disclosure, matches creatives with URLs so as to increase the relevance of the combined creative and URL to the search conducted by user 107.

Figure 4A:
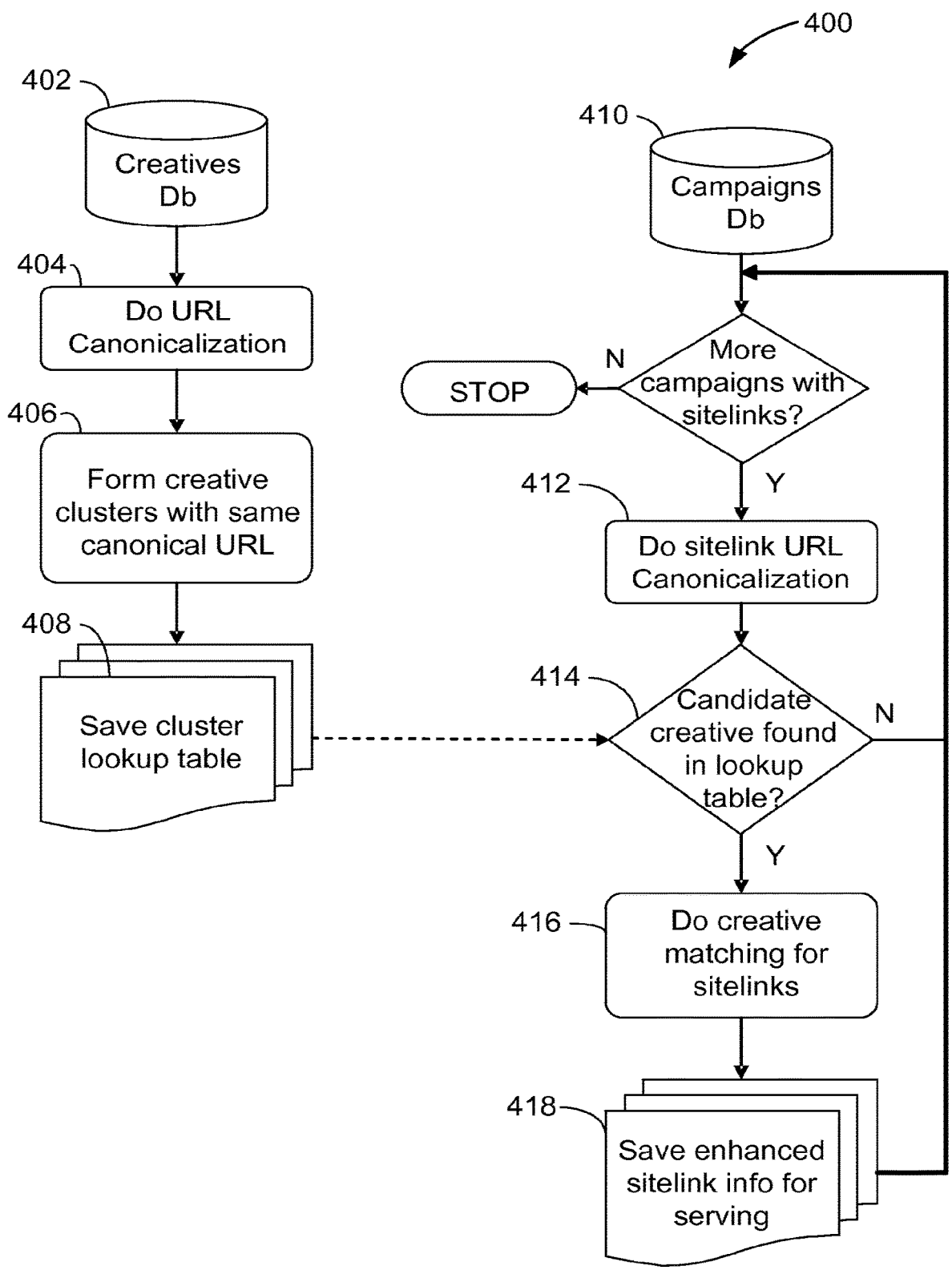
FIG. 4A is a flowchart of an example method for enhancing sitelinks with creative content.

FIG. 4A is a flowchart of an example method 400 for enhancing, for example, sitelink 312 with creative content, such as text 320 (shown in FIG. 3). Method 400 is described in the context of the results of a search performed by a user 107, which yields a primary result 302 (shown in FIG. 3), and a plurality of additional or secondary results (also referred to as the "extension"), although some of the steps such as the storing and/or canonicalization of creatives and/or sitelinks may be performed prior to a search by a user 107. As used herein, "canonicalization" refers to a process for converting data that has more than one possible representation into a "standard", "normal", or canonical form. This can be done to compare different representations for equivalence, to count the number of distinct data structures, to improve the efficiency of various algorithms by eliminating repeated calculations, or to make it possible to impose a meaningful sorting order. This can also be done to provide to the content to a different format that can be displayed by a second device but not a first device. Data processing system 106 generates and stores 402 in a creatives database (which in an example embodiment is content item repository 136 shown in FIG. 1) a candidate set of creatives associated with each content provider specified sitelink. Each sitelink has a URL associated with it, as does each creative. In one embodiment of the present disclosure, data processing system 106 simply associates all creatives with the same URL as the sitelink as being part of a candidate set. In another example embodiment, data processing system 106 canonicalizes 404 the creative URLs to identify characteristics of the URLs that will enable the creative URLs to be grouped into creative clusters. Canonicalization of creative-associated URLs may be accomplished through a variety of schemes, including analyzing landing pages associated with the sitelinks to compare the contents of the respective landing pages to identify significant similarities amongst the landing pages, wherein significant similarities are determined using one or more predefined rules or parameters. In an alternative scheme, canonicalization of creative-associated URLs includes crawling the creative-associated URL with and without a URL parameter associated with the creative-associated URL, comparing the landing pages, and removing the parameter from the creative-associated URL when the landing pages match. In addition, canonicalizing creative-associated URLs may include application of webmaster-supplied rules that indicate the relevance of URL parameters. After canonicalization, data processing system 106 forms 406 creative clusters, such that creatives within a cluster share the same canonical URL. Data processing system 106 then saves 408 the clusters in a cluster lookup table. In some implementations, the canonical URL can be a link to another type (or format) of content item that is associated with a primary search result. For example, the primary search result can be provided in a text based format. The canonical URL can be to a digital component that is in a video, audio, graphical, or other type of display or presentation format. The canonical URL can be included in an action data structure.

Data processing system 106 stores data regarding content item campaigns in campaign database or repository 150

(shown in FIG. 1). The campaign data includes sitelinks associated with various landing pages. Before matching sitelink URLs to creative URLs, sitelink URLs are canonicalized 412 to identify and account for content provider redirects and other parameters in the URLs, used for recording and reporting site activity, that are otherwise inconsequential to directing a user to the final landing page associated with each URL. In one embodiment of a canonicalization scheme, data processing system 106 identifies parameters in a link URL that are not important to identify a corresponding landing page by crawling the link URL with and without the parameter and then comparing the landing pages in each iteration for matches. Where landing pages match after crawling, the parameter is removed. In an embodiment, data processing system 106 applies webmaster supplied rules as to relevance of URL parameters for landing page purposes. Following a user search, data processing system 106 identifies a plurality of relevant sitelinks and refers 414 to the saved creative cluster lookup table for one or more clusters of candidate creatives to match to the specified sitelinks. In addition to, or as an alternative to associating sitelinks with content item campaigns, sitelinks may also be associated with other entities, such as content item groups.

Once a candidate set of creatives has been identified, in one embodiment, data processing system 106 applies specific filter rules and/or policy checks related to the suitability of the creative for the specific sitelink, to eliminate matches of creatives to sitelinks that are expressly excluded, or simply inappropriate, relative to the search specified by user 107. Examples of filter rules or policy checks include demographic, geographic and language checks (to ensure that the creative is appropriate to user device location, for example), user device and/or platform rules, as well as checks to ensure that the candidate creatives are compatible with the status of the content item campaign. In another example embodiment, data processing system 106 prunes the set of candidate creatives by performing deduping to remove redundancies and duplication between creatives found for a specific sitelink and by applying other policy checks such as the size of the available candidate set and estimated measures of the improvement to content item CTR ("click-through-rate"). After a set of candidate creatives for possible matching with a specified sitelink has been identified, data processing system 106 performs creative matching 416. After a creative has been matched to a specified sitelink to create an enhanced sitelink, data processing system 106 saves 418 data representing the enhanced sitelink, to be served to user 107.

Often, there can be several creative variants that could be matched with a given sitelink. In an example embodiment, data processing system 106 performs creative matching by generating permutations of matches between one or more specified sitelinks and corresponding candidate creatives, and assigning scores to each permutation that reflects a relative value of the "fit" of each proposed match. The score may be based on various signals such as an impression score, which is a measure of how many times that creative was shown over a recent timeframe such as a week, and an IDF-score, which is a measure of similarity of terms between a sitelink text and a creative text.

In one embodiment, in which two or more sitelinks are being matched with two or more creatives, all applicable creatives that are associated with each candidate sitelink are ordered, based on impression count. As used herein, "impression count" refers to the number of times that an item, such as a creative, has been presented to online users. Then, each sitelink is matched with an as yet unmatched creative with the highest score. Remaining sitelinks are successively matched with the next highest scoring creatives, until all sitelinks are matched with creatives. Using such a methodology may result in the maximization of an individual match, at the expense of optimal matching of a group of sitelinks to a set of candidate creatives. Accordingly, in one embodiment, if using this methodology, a total match score is determined that is below a predefined threshold, data processing system 106 uses a more globally optimal matching algorithm.

The globally optimal matching algorithm is implemented as follows. For example, two sitelinks S1 and S2 are to be provided to a user 107 in response to a search. Assume S1 can be matched to two (non-duplicative) creatives C1 and C2, having match scores of 10 and 8, respectively. Likewise, S2 can also be matched to C1 and C2, but with corresponding match scores of 8 and 2, respectively. In a matching scheme in which a first creative match score is optimized, the resulting association is S1-C1 and S2-C2 with an overall score of 12.

Figure 6:
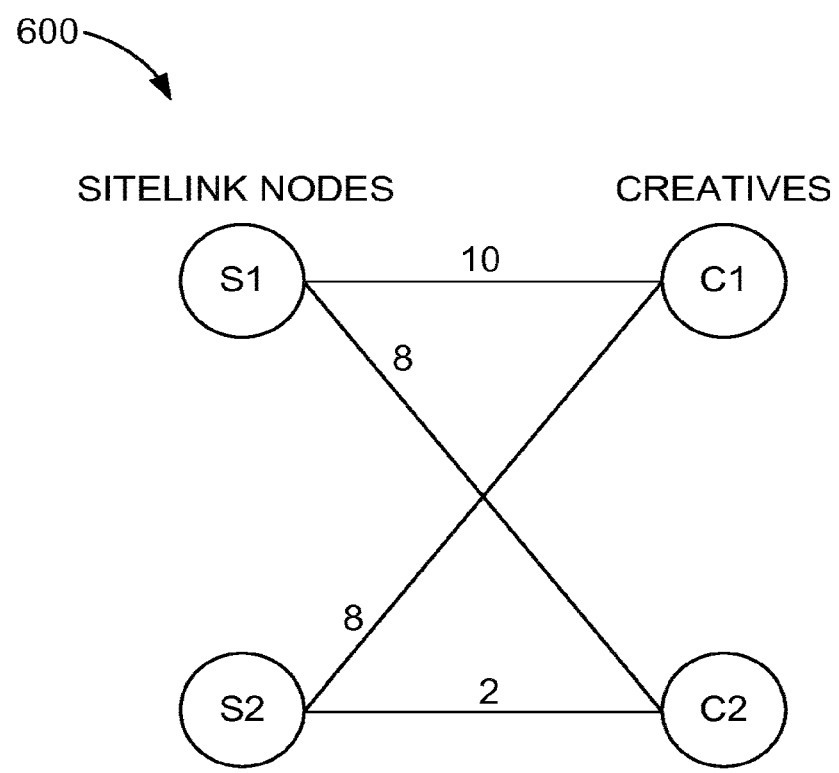
FIG. 6 is an example bipartite graph that may be used in matching sitelinks with creative content in accordance with one embodiment of the present disclosure.

FIG. 6 is an example bipartite graph 600 that may be used in matching sitelinks S1 and S2 with creatives C1 and C2. data processing system 106 constructs bipartite graph 600 in which a set of specified sitelinks (S1, S2) constitutes one set of nodes and the creatives (C1, C2) in a candidate set form the other set of nodes. Data processing system 106 adds an edge (shown as a connecting line in graph 600) between a sitelink node and a creative to which it can be matched and the weight of the edge (the number adjacent the connecting line) is the match-score for the respective sitelink-creative pairing. Data processing system 106 performs a constrained maximal matching on this graph to obtain the overall best score subject to the constraint that there is no inter-sitelink creative duplication. Using the numerical values from the previous example, the bipartite matching scheme generates an improved matching of S1-C2 and S2-C1 with a total score of 16.

Specifically, in the alternative globally optimal matching methodology, a path growing heuristic is used, with additional modifications to avoid seed-bias, to provide match augmentation and to account for conflict resolution. Referring to the simplified example described above, the basic approach is to maintain two sets of paths obtained by alternatively performing 1) expansion from a sitelink to get its best remaining creative (e.g., the assignment S1-C2 provided above), with 2) expansion from a creative for its best remaining sitelink to which it can be assigned (e.g., the assignment S2-C1 provided above). The edges visited in each step get added to one of the two path-sets in alternating fashion. At each step, data processing system 106 checks for duplicate creatives and/or redundant creatives (similar but not identically-duplicate creatives) from amongst the selected creatives, and rejects them. In addition, data processing system 106 applies a predefined size constraint, in which matches that yield a score below a predefined threshold are discarded. If there are no choices available to grow a path from a certain node, data processing system 106 restarts the process with the next sitelink that has not yet been explored. Data processing system 106 also does not revisit a sitelink or creative node.

Referring to the example described above, when all sitelink nodes have been explored, data processing system 106 obtains two possible assignments, In one example, data processing system 106 additionally attempts to 'augment' these assignments by checking if there are any unassigned sitelinks in each assignment. If unassigned sitelinks exist, they are matched with any available creatives that are eligible.

Data processing system 106 selects the assignment that has a higher score and meets the size constraint. The creative matching process, using the described algorithm, could yield different results based on the order in which sitelinks are initially arranged. This 'seed-bias' can be resolved by repeating the matching with different orders. When the number of sitelinks is a small number (6 or fewer), performing the necessary iterations of calculations to address all possible permutations is considered manageable. In one embodiment, data processing system 106 may apply rules, applicable for example to more than 6 sitelinks, to define subsets in order to limit the number of permutations that are performed, to streamline the matching process.

Figure 7:
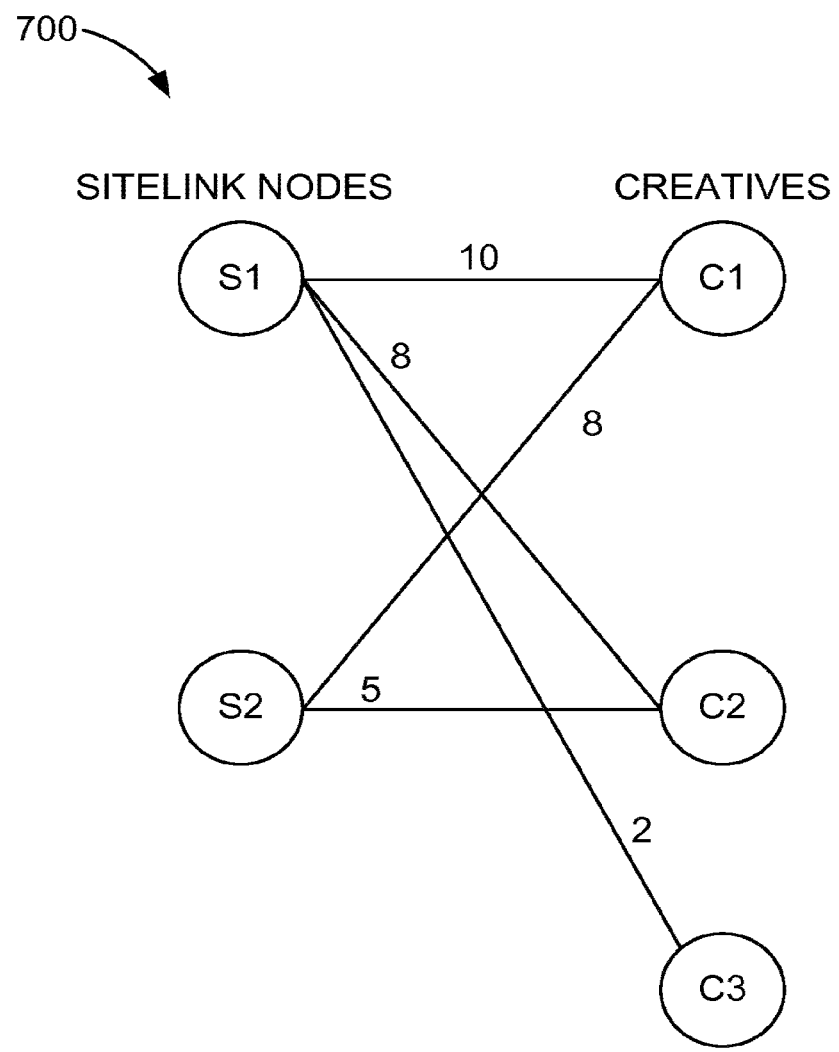
FIG. 7 is another example bipartite graph that may be used in matching sitelinks with creative content in accordance with one embodiment of the present disclosure.

FIG. 7 is another example bipartite graph 700 illustrating a slightly more complex scenario than that illustrated in FIG. 6. In the scenario of FIG. 7, sitelinks S1 and S2 can be potentially matched with creatives C1, C2 or C3. Specifically, S1 can be matched with C1, C2, and C3, with scores of 10, 8, and 5, respectively. Likewise, C2 can be matched with C1 and C2 with scores of 8 and 5, respectively. Because C1 and C2 can be matched with both of links S1 and S2, though not simultaneously, an optimal matching must take this constraint into consideration. Further, it is possible that C1 and C2 cannot both be part of the same matching as they may be deemed redundant to one another. In such a situation, an optimal matching would be S1-C3 and S2-C1.

In one embodiment, creatives may be ranked by metrics in addition to, or other than, impression count. Such an approach is desirable when a set of candidate creatives are not otherwise clearly differentiated by their respective impression counts. In addition, such an approach improves the quality of the results of the matching process by ensuring that the creatives shown in association with the selected sitelinks are related to the text in the sitelink. Accordingly, an additional scoring factor, referred to herein as an IDF score, is used. As used herein, "IDF" refers to "inverse-document-frequency," which refers to one of a number of known methodologies for analyzing term frequency within a document (or item of publication), while correcting for terms that are simply generally frequently encountered in a group of documents (or items of publication). Accordingly, a creative score is represented as:

Creative Score=$w1 \times$Impression Score+$w2 \times$IDF Score, where $0 \leq w1 \leq 1$ and $0 \leq w2 \leq 1$. When $w1=1$, and $w2=0$, only impression scores are counted. When $w1=0$ and $w2=1$, only IDF based scores are counted. In one embodiment, when performing IDF scoring, both sitelink text and creative text are normalized. As used herein, "normalized" means that terms are reduced to their stems, and stopwords (typically, short, functional words such as "the," "is," "at," "which," and "on") are removed. The IDF score is the weighted sum of words common to both a creative and an associated sitelink. In addition, IDF scoring may be performed in a uniform mode, in which no external influences are used, and all terms are given equal weight. Alternatively, in a non-uniform mode, different terms may be given different weights, based on external considerations. For example, the term "sale" may have a high IDF weight in a general corpus of text items, but may carry a lower weight in a corpus comprised of only creatives.

The foregoing detailed description illustrates embodiments of the disclosure by way of example and not by way of limitation. It is contemplated that the disclosure has general application to the review and revision of content items. It is further contemplated that the methods and systems described herein may be incorporated into existing online content delivery planning systems, in addition to being maintained as a separate stand-alone application.

Figure 4B:
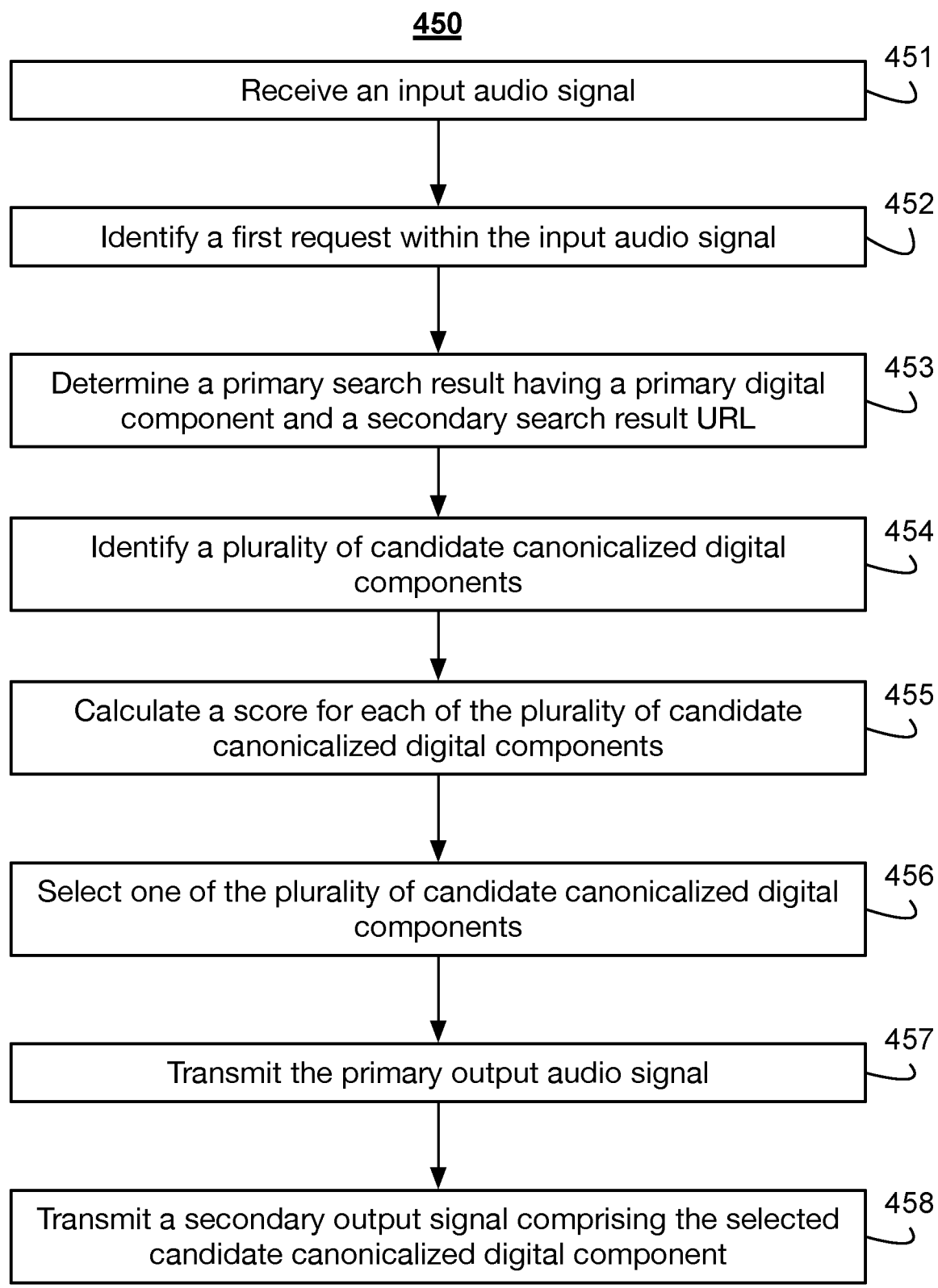
FIG. 4B illustrates a block diagram of an example method of transmitting data in a voice activated computer network in accordance with one embodiment of the present disclosure.

FIG. 4B illustrates a block diagram of an example method 450 of transmitting data in a voice activated computer network. The method 450 can include receiving an input audio signal (step 451). The method 450 can include identifying a first request within the input audio signal (step 452). The method 450 can include determining a primary search result that has a primary digital component and a secondary search result URL (step 453). The method 450 can include identifying a plurality of candidate canonicalized digital components (step 454). The method 450 can include calculating a score for each of the plurality of candidate canonicalized digital components (step 455). The method 450 can include selecting one of the plurality of candidate canonicalized digital components (step 456). The method 450 can include transmitting the primary output audio signal (step 457). The method 450 can include transmitting a secondary output signal that includes the selected candidate canonicalized digital component (step 458).

The method 450 can include receiving, via an interface, data packets that can include an input audio signal (ACT 451). The input audio signal can be detected by a sensor, such as a microphone, of a client computing device. For example, the NLP component, executed by the data processing system, can receive from the client computing device data packets that include an input audio signal. The received data packets can be received via the network as packet or other protocol based data transmissions.

The method 450 can include identifying a first request within the input audio signal (ACT 452). The request can be identified by the NLP component. The NLP component can also identify a trigger keyword within the input audio signal. For example, the NLP component can parse the input audio signal to identify requests that relate to subject matter of the input audio signal, or to identify trigger keywords that can indicate, for example, actions associated with the requests.

The method 450 can include determining a primary search result that has a primary digital component and a secondary search result URL (ACT 453). The primary search result can be based on the first request. The secondary search result URL can be related to the primary search result. The content selected component can receive the first request and the trigger keyword. The content selector component can select the primary digital component based on the first request and the trigger keyword via a real-time content selection process. The secondary search result URL can be to or be included in an action data structure. The secondary search results URL can be a link to a digital component that can provide additional information about the primary search results. For example, if the input audio signal includes the input "Ok, when is my flight." The secondary search URL can be a link to possible actions that can be taken based on the response to the input. For example, the secondary search URL could be an action to locate the reservation number of the airline with which the flight is book, location the URL of the airline's website, or determine the flight status of the flight. In some implementations, the response to the primary search results can be included in a first action data structure. The secondary search URL can be used to generate a second action data structure. The first and second action data structures can be sent to the client computing device that transmitted the request in a conversational manner.

The method 450 can include identifying a plurality of candidate canonicalized digital components associated with the secondary search result URL (ACT 454). Each of canonicalized digital components can be digital components that are identified in response to executing the action identified by the secondary search URL. Each of the canonicalized digital components can be in the same or different format from one another. For example, the canonicalized digital components can be video-based, audio-based, text-based, image-based, or a combination thereof. Each of the plurality of candidate canonicalized digital components can include a URL to a video-based digital component. Continuing the above example, with the input of "Ok, when is my flight," the canonicalized digital components for a secondary search URL to provide the phone number of the airline could be a text string of the phone number to the airline, a link to a webpage containing the airline's phone number, or an audio file of a computerized voice reading the airline's phone number.

The method 450 can include calculating a respective score for each of the plurality of candidate canonicalized digital components (ACT 455). The score for each of the plurality of canonicalized digital components can be based on a term frequency within each of the plurality of canonicalized digital components. The score can be the above described impression score, IDF score, or a combination thereof, such as a creative score.

The method can include selecting one of the plurality of candidate canonicalized digital components (ACT 456). The selection of one of the candidate canonicalized digital components can be based on the respective score for each of the plurality of canonicalized digital components. The data processing system can use a filter rule to selecting one of the candidate canonicalized digital components. The filter rules can include at least one of a language rule, a geographic rule, a user device rule, and a platform rule. The filter rules or policy checks can be used to ensure that the selected candidate digital component is appropriate to user device location, for example. The candidate canonicalized digital components can be scored based on the resources or capabilities of the client computing device to receive the canonicalized digital component. The resources can include the battery life, a processor utilization, a memory utilization, an interface parameter, or a bandwidth utilization. The capabilities can include the output capabilities of the client computing device that will receive the canonicalized digital component. The capabilities can include whether the device has is capable of displaying video or images or playing audio messages. For example, if the receiving device includes speakers but not a screen, image- and video-based canonicalized digital components can be given a low score while an audio-based canonicalized digital component can be given a relatively higher score. The device receiving the canonicalized digital component can be the same device that originally transmitted the input audio signal.

The method 450 can include transmitting a primary output audio signal (ACT 457). The output audio signal can include the primary digital component. The interface management component can transmit the primary output audio signal to the primary interface. The digital component can be included in an action data structure. The action data structure can be generated by the direction action API. The action data structure can be based on the request and the trigger keyword. The action data structures can indicate organic or non-sponsored content related to the input audio signal. The data processing system can generate the primary output audio signal responsive to processing the action data structure. In some implementations, the action data structure can be transmitted to a service provider that can generate the primary output audio signal for transmission to a client computing device.

The method 450 can include transmitting a secondary output signal comprising the selected candidate canonicalized digital component (ACT 458). The secondary output signal can be transmitted, by the interface management component, to a secondary interface. The secondary interface can be the primary interface or another interface of the client computing device that transmitted the audio input signal to the system. The secondary interface can be an interface of a second client computing device that is associated with the client computing device that transmitted the audio input signal to the system. For example, the two client computing devices can be associated with the same user account.

The second interface, which can be on a second client computing device, can be selected through a polling process. The polling process can include polling, by an interface management component, a plurality of interfaces to identify different candidate interfaces, such as a first candidate interface and a second candidate interface. The candidate interfaces can include candidate interfaces that can render, display, or receive the selected digital component, canonicalized digital component, or action data structure. For example, the interface management component can query interfaces that are capable of displaying video of the digital component includes video. The interface management component can determine different attributes of the digital component to determine if the candidate interfaces can render, display, or receive the selected digital component, canonicalized digital component, or action data structure. The attributes can include the shape, size, color, font, presentation style (e.g., audio, video, graphical, textual), and resource requirements of the digital component, canonicalized digital component, or action data structure. The polling process can also include determining, by the interface management component, resource utilization values for each of the candidate interfaces. The resource utilization values can be based on at least one of a battery status, a processor utilization, a memory utilization, an interface parameter, or a bandwidth utilization of the device associated with the respective candidate interface. After the polling process, the method can include selecting, by the interface management component, the first candidate interface as the primary interface based on a comparison of the resource utilization values of the candidate interfaces, the attributes of the digital component, a combination thereof, or a comparison thereof.

In one example, the input audio signal can be "Ok, what actor plays in the movie [movie name]" can be received from an audio-based digital assistant. The system can identify a primary digital component that includes the actor's name. The secondary search URL can be a search for Internet videos that include the actor. Each of the videos can be a canonicalized digital component. The digital component including the actor's name can be transmitted back to the audio-based digital assistant, which can play the message of the digital component, "The actor's name is [actor's name]. Would you like to view the latest video including [actor's name] on your Internet connected TV?" If a response of "yes" is received in response to the question, the data processing system can select one of the canonicalized digital components for transmission the user's Internet connected TV. The data processing system, determining that the audio-based digital assistant is not configured to display video could identify the TV during the above-described polling process. The canonicalized digital component, once received by the Internet connected TV, can begin to play the video associated with the canonicalized digital component.

Figure 5:
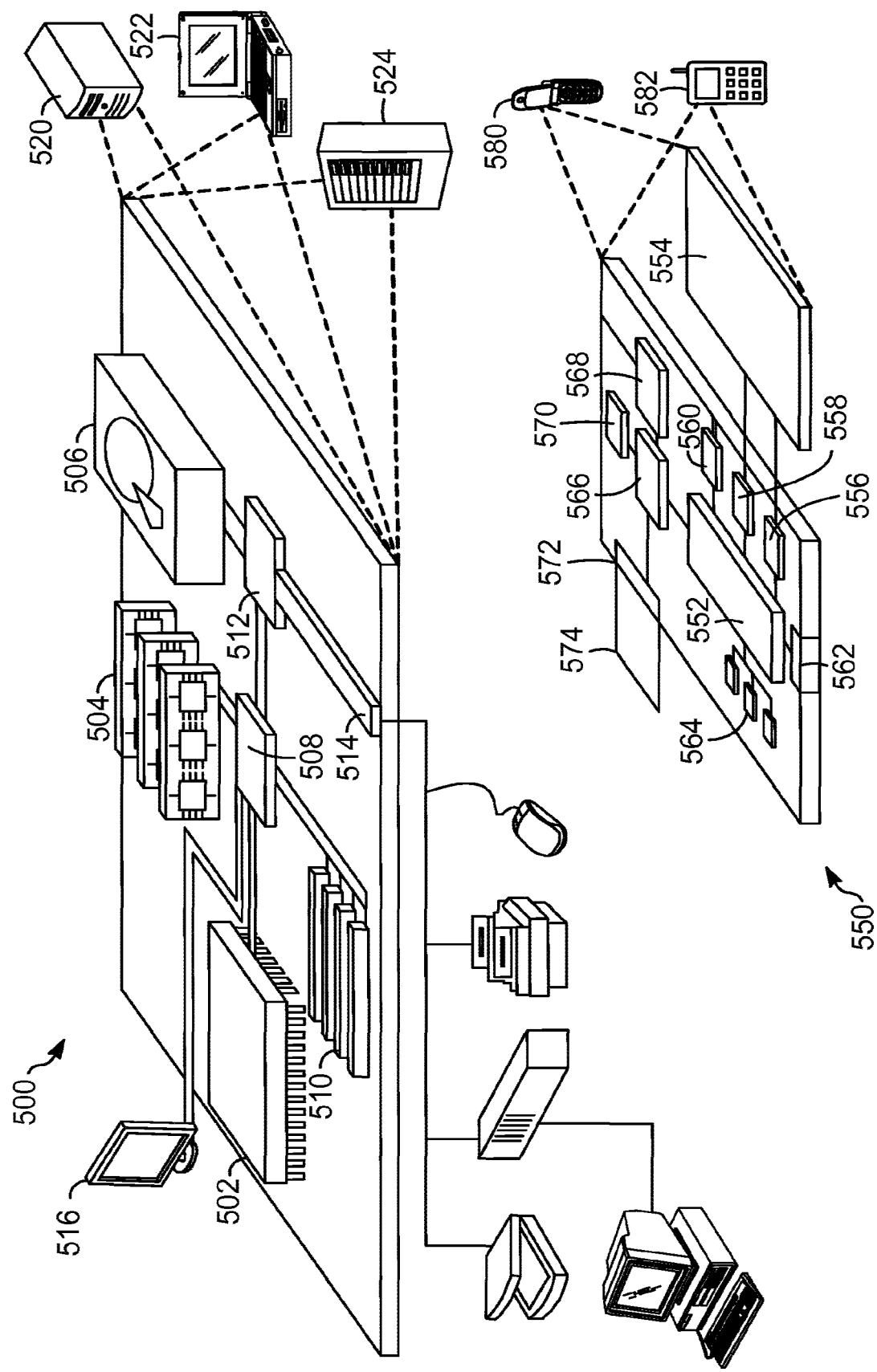
FIG. 5 is a diagram of example computing systems that may be used in the environment shown in FIG. 1 in accordance with one embodiment of the present disclosure.

FIG. 5 is a diagram of example computing devices 500 and 550 that may be used in the environment shown in FIG. 1. More specifically, FIG. 5 shows an example of a generic computing device 500 and a generic mobile computing device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be examples only, and are not meant to limit implementations of the disclosures described and/or claimed in this document.

Computing device 500 includes a processor 502, a memory 504, a storage device 506, a high-speed interface/controller 508 connecting to memory 504 and high-speed expansion ports 510, and a low speed interface/controller 512 connecting to a low speed bus 514 and storage device 506. Each of the components 502, 504, 506, 508, 510, and 512, are interconnected using various buses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed bus 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as computing device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The computing device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the computing device 550, such as control of user interfaces, applications run by computing device 550, and wireless communication by computing device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of computing device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to computing device 550 through expansion interface 572, which may include, for example, a SIMM (Single In Line Memory Module) card interface. Such expansion memory 574 may provide extra storage space for computing device 550, or may also store applications or other information for computing device 550. Specifically, expansion memory 574 may include instructions to carry out or supplement the processes described above, and may include secure information also. Thus, for example, expansion memory 574 may be provide as a security module for computing device 550, and may be programmed with instructions that permit secure use of computing device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Computing device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS (Global Positioning system) receiver module 570 may provide additional navigation- and location-related wireless data to computing device 550, which may be used as appropriate by applications running on computing device 550.

Computing device 550 may also communicate audibly using audio codec 560, which may receive spoken information from a user and convert it to usable digital information. Audio codec 560 may likewise generate audible sound for a user, such as through a speaker, e.g., in a handset of computing device 550. Such sound may include sound from voice telephone calls, may include recorded sound (e.g., voice messages, music files, etc.) and may also include sound generated by applications operating on computing device 550.

The computing device 550 may be implemented in a number of different forms, as shown in the figure. For example, it may be implemented as a cellular telephone 580. It may also be implemented as part of a smart phone 582, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing systems 500 and 550 are configured to receive and/or retrieve data pertaining to the creation, review and revision of online content items; data regarding content providers, content delivery links or impressions corresponding to those content providers that appear on a web page, and metrics corresponding to the appearance of those impressions on that web page, etc., from various other computing devices connected to computing devices 500 and 550 through a communication network, and store this data within at least one of memory 504, storage device 506, and memory 564. Computing systems 500 and 550 are further configured to manage and organize the data within at least one of memory 504, storage device 506, and memory 564 using the techniques described herein.

The logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to transmit packetized data in a voice activated computer network environment, the system comprising a data processing system having a processor and a memory to:
   receive, via an interface, data packets comprising an input audio signal detected by a sensor of a client computing device;
   identify a first request within the input audio signal detected by the sensor of the client computing device;
   determine, based on the first request, a primary search result having a primary digital component, the primary digital component having a primary search result uniform resource locator (URL), the primary search result URL lacking a first parameter;
   identify, based on the primary search result and the first request, a plurality of candidate secondary digital components, each of the plurality candidate secondary digital components indexed as associated with the primary digital component, each of the plurality of candidate secondary digital components having a secondary search result URL, the secondary search result URL having a second parameter;
   generate a canonicalized secondary search result URL from the secondary search result URL for each of the plurality of candidate secondary digital components by removing the second parameter;
   identify, from the canonicalized secondary search result URL generated for each of the plurality of candidate secondary digital components, groups of canonicalized secondary search result URLs, each group corresponding to one of the plurality of candidate secondary digital components;
   determine a respective score for each of the plurality of candidate secondary digital components based on content of the primary digital component and a respective secondary digital component for each group canonicalized secondary search result URLs;
   select a secondary digital component from the plurality of candidate secondary digital components based on the respective score for each of the plurality of candidate secondary digital components and a filter rule;
   transmit a primary output audio signal comprising the primary digital component; and
   transmit a secondary output signal comprising the secondary digital component.

2. The system of claim 1, comprising a natural language processor component to:
   receive the data packets comprising the input audio signal; and
   parse the input audio signal to identify the first request and a trigger keyword.

3. The system of claim 2, comprising a content selector component to:
   receive the first request and the trigger keyword; and
   select the primary digital component based on the first request and the trigger keyword via a real-time content selection process.

4. The system of claim 1, wherein the selected one of the plurality of candidate secondary digital components comprises a URL to a video-based digital component.

5. The system of claim 4, comprising the data processing system to:

transmit the secondary output signal to a second client computing device different than the client computing device.

6. The system of claim 1, comprising an interface management component to:
poll a plurality of interfaces to identify a first candidate interface and a second candidate interface;
determine a first attribute of the primary digital component and a second attribute of the selected on of the plurality of candidate secondary digital components;
determine a first resource utilization value of the first candidate interface and a second resource utilization value of the second candidate interface;
select the first candidate interface as a primary interface based on a comparison of the first resource utilization value and the second resource utilization value; and
select the second candidate interface as a secondary interface based on the comparison of the first resource utilization value and the second resource utilization value.

7. The system of claim 6, wherein the interface management component:
transmits the primary output audio signal to the primary interface; and
transmits the secondary output audio signal to the secondary interface.

8. The system of claim 6, wherein the interface management component:
determines the first resource utilization value of the first candidate interface based on at least one of a battery status, a processor utilization, a memory utilization, an interface parameter, or a bandwidth utilization of the first candidate interface; and
determines the second resource utilization value of the second candidate interface based on at least one of a battery status, a processor utilization, a memory utilization, an interface parameter, or a bandwidth utilization of the second candidate interface.

9. The system of claim 1, wherein the respective score for each of the plurality of secondary digital components is based on a term frequency within each of the plurality of candidate secondary digital components.

10. The system of claim 1, wherein the filter rule include at least one of a language rule, a geographic rule, a user device rule, and a platform rule.

11. A method of data transmission in a voice activated computer network environment, comprising:
receiving, via an interface, data packets comprising an input audio signal detected by a sensor of a client computing device;
identifying a first request within the input audio signal detected by the sensor of the client computing device;
determining, based on the first request, a primary search result having a primary digital component, the primary digital component having a primary search result uniform resource locator (URL), the primary search result URL having a first parameter;
identifying, based on the primary search result and the first request, a plurality of candidate secondary digital components, each of the plurality candidate secondary digital components indexed as associated with the primary digital component, each of the plurality of candidate secondary digital components having a secondary search result URL, the secondary search result URL having a second parameter;
generating a canonicalized secondary search result URL from the secondary search result URL for each of the plurality of candidate secondary digital components by removing the second parameter;
identifying, from the canonicalized secondary search result URL generated for each of the plurality of candidate secondary digital components, groups of canonicalized secondary search result URLs, each group corresponding to one of the plurality of candidate secondary digital components;
calculating a respective score for each of the plurality of candidate secondary digital components based on content of the primary digital component and a respective secondary digital component for each group of canonicalized secondary search result URLs;
selecting a secondary digital component from the plurality of candidate secondary digital components based on the respective score for each of the plurality of candidate secondary digital components and a filter rule;
transmitting a primary output audio signal comprising the primary digital component; and
transmitting a secondary output signal comprising the selected secondary digital component.

12. The method of claim 11, comprising:
receiving, by a natural language processor component, the data packets comprising the input audio signal; and
parsing, by the natural language processor component, the input audio signal to identify the first request and a trigger keyword.

13. The method of claim 12, comprising:
receiving, by a content selector component, the first request and the trigger keyword; and
selecting, by the content selector component, the primary digital component based on the first request and the trigger keyword via a real-time content selection process.

14. The method of claim 11, wherein the selected one of the plurality of candidate secondary digital components comprises a URL to a video-based digital component.

15. The method of claim 14, comprising:
transmitting the secondary output signal to a second client computing device different than the client computing device.

16. The method of claim 11, comprising:
polling, by an interface management component, a plurality of interfaces to identify a first candidate interface and a second candidate interface;
determining, by the interface management component, a first attribute of the primary digital component and a second attribute of the selected on of the plurality of candidate secondary digital components;
determining, by the interface management component, a first resource utilization value of the first candidate interface and a second resource utilization value of the second candidate interface;
selecting, by the interface management component, the first candidate interface as a primary interface based on a comparison of the first resource utilization value and the second resource utilization value; and
selecting, by the interface management component, the second candidate interface as a secondary interface based on the comparison of the first resource utilization value and the second resource utilization.

17. The method of claim 16, comprising:
transmitting, by the interface management component, the primary output audio signal to the primary interface; and
transmitting, by the interface management component, the secondary output signal to the secondary interface.

18. The method of claim 16, comprising:
determining, by the interface management component, the first resource utilization value of the first candidate interface based on at least one of a battery status, a processor utilization, a memory utilization, an interface parameter, or a bandwidth utilization of the first candidate interface; and
determining, by the interface management component, the second resource utilization value of the second candidate interface based on at least one of a battery status, a processor utilization, a memory utilization, an interface parameter, or a bandwidth utilization of the second candidate interface.

19. The method of claim 11, comprising:
calculating the score for each of the plurality of candidate secondary digital components based on a term frequency within each of the plurality of candidate secondary digital components.

20. The method of claim 11, comprising:
filtering the plurality of candidate secondary digital components based on at least one of a language rule, a geographic rule, a user device rule, and a platform rule.

* * * * *